United States Patent
Bisdikian

(12) 
(10) Patent No.: US 6,181,687 B1
(45) Date of Patent: Jan. 30, 2001

(54) SYSTEM AND A METHOD FOR CONTINUOUSLY ADJUSTABLE, SPLITTING GROUP, MULTI-CONTENTION RESOLUTION IN MULTI-ACCESS COMPUTER COMMUNICATION SYSTEMS

(75) Inventor: Chatschik Bisdikian, Mt. Kisco, NY (US)

(73) Assignee: International Business Machines Corporation, Armonk, NY (US)

(*) Notice: Under 35 U.S.C. 154(b), the term of this patent shall be extended for 0 days.

(21) Appl. No.: 09/176,917

(22) Filed: Oct. 22, 1998

(51) Int. Cl.[7] .............. H04B 7/212; H04B 7/216; H04B 7/204
(52) U.S. Cl. ............. 370/347; 370/342; 370/348; 370/319
(58) Field of Search .................. 370/347, 342, 370/348, 319

(56) References Cited

U.S. PATENT DOCUMENTS

| | | | |
|---|---|---|---|
| 4,736,371 | * 4/1988 | Tejima et al. | 370/236 |
| 4,745,599 | * 5/1988 | Raychaudhuri | 370/348 |
| 4,774,707 | * 9/1988 | Raychaudhuri | 370/447 |
| 5,012,469 | * 4/1991 | Sardana | 370/322 |
| 5,303,234 | * 4/1994 | Kou | 370/442 |
| 5,390,181 | * 2/1995 | Campbell et al. | 370/444 |
| 5,590,131 | * 12/1996 | Kabatepe | 370/461 |
| 5,894,473 | * 4/1999 | Dent | 370/342 |
| 5,917,810 | * 6/1999 | Bot | 370/294 |

OTHER PUBLICATIONS

J.E. Dail, et al., "Adaptive Digital Access Protocol: A MAC Protocol for Multiservice Broadband Access Networks," *IEEE Communications Magazine*, vol. 34, No. 3, pp. 104–112 (1996).

C. Bisdikian, et al., "mS Start: A Random Access Algorithm for the IEEE 802.14 HFC Network," *Computer Communications*, vol. 19, No. 11, pp. 876–887 (1996).

D.J. Aldous, "Ultimate instability of exponential back–off protocol for acknowledgment–based transmission control of random access communication channels," *IEEE Trans. on Information Theory*, vol. 33, No. 2, pp. 219–223, 1987.

D. Bertsekas, et al. *Data Networks*, 2nd. ed., Prentice Hall, 1992.

C. Bisdikian, "A review of random access algorithm," *Int'l Workshop on Mobile Communications*, pp. 123–127, Thessaloniki, Greece, Sep. 1996.

L. Georgiadis, et al. "A collision resolution protocol for random access channels with energy detectors," *IEEE Trans. on Communications*, vol. 30, No. II, pp. 2413–2420, Nov. 1982.

(List continued on next page.)

*Primary Examiner*—Krisna Lim
(74) *Attorney, Agent, or Firm*—Scully, Scott, Murphy & Presser

(57) ABSTRACT

The present invention relates to a communication system where tree-search or stack contention-resolution algorithms in hybrid MAC protocols are used by CaTV stations to resolve message transmission collisions. The stations, which are computer communicating devices, communicate by message transmissions over a communications channel where message contents of some of these transmissions are destroyed by collision of those messages sent from different stations. To resolve message transmission collisions, non-overlapping transmission time intervals of variable durations are generated and grouped into clusters of varying number of time intervals and varying time distances between them. Sequences of clusters are formed in which any station transmitting in a particular cluster will learn of the status of its message transmissions before commencement of the next cluster. Collision resolution is performed collectively on all message transmissions in a cluster and along the successive clusters of the same sequence.

82 Claims, 12 Drawing Sheets

OTHER PUBLICATIONS

B.S. Tsybakov, "Survey of USSR Contributions to Random Multi-Access Communications," *IEEE Trans. on Information Theory,* vol. 31, No. 2, pp. 143–165, Mar. 1985.

P. Mathys, et al., "Q-ary collision resolution algorithms in random-access systems with free or blocked channel access," *IEEE Trans. on Information Theory,* vol. 31, No. 2, Mar. 1985.

L. Merakos, et al. "Delay analysis of the n-ary stack algorithm for a random access broadcast channel," *IEEE Trans. on Inform. Theory,* vol. 34, No. 5, Sep. 1988.

L. Georgiadis, et al. "Limited Feedback Sensing Algorithms for the Packed Broadcast Channel," *IEEE Trans. on Information Theory,* vol. 31, No. 2, pp. 280–294, Mar. 1985.

W. Xu, et al., "A Distributed Queueing Random Access Protocol for a Broadcast Channel," *Computer Communication Review,* vol. 23, No. 4, pp. 270–278, Oct. 1993.

* cited by examiner

SYSTEM AND A METHOD FOR CONTINUOUSLY ADJUSTABLE, SPLITTING GROUP, MULTI-CONTENTION RESOLUTION IN MULTI-ACCESS COMPUTER COMMUNICATION SYSTEMS

BACKGROUND OF THE INVENTION

1. Field of the Invention

This invention relates to a digital data, multi-access computer communication system where a number of stations communicate with each other over a common frequency spectrum, by sharing a sequence of transmission time intervals.

2. Description of Prior Art

With the ever increasing penetration of digital communication into everyday business and personal lives, and a demand for an ever increasing accumulation of image and graphics oriented data communication services, like remote access to corporate computer resources, telecommuting, Internet access and Web surfing, remote and interactive education and entertainment, interactive video services, etc., service providers and network operators are striving to satisfy the demand.

The only way for the vast majority of residential customers to access data services is through voice-grade telephone modems. Currently, the fastest of modems perform at transmission speeds of at most 56 kilobits per second, however, commonly actual transmission speeds are much lower. Today's modems are capable of adequately supporting only narrow-band text-oriented services like e-mail and are inadequate in supporting applications requiring much higher speeds. These new applications can only be supported marginally, if at all, by today's voice-grade telephone modems.

A new breed of communication technologies was introduced to support the higher transmission speeds required by new broadband data services. This higher transmission speed could be in excess of 1 megabits per second. Telephone service providers, Cable TV (CaTV) service providers, wireless and cellular service providers, and even electric utility service providers are exploring and developing alternative, sometimes supplemental and sometimes competing, communication technologies and networking solution offerings for their customers to assist them in gaining access to the bandwidth-demanding new services.

The CaTV broadband data network provides two-way communication between subscriber computer systems and the CaTV head-end (H/E). From there, the two-way communications continue to the rest of the digital data network to which the CaTV plant is connected. Subscriber computer systems are connected to the CaTV H/E via a device called the cable modem, which can be located internally or externally with respect to the subscriber computer system. The cable modem connects to the H/E via the same CaTV cable used for regular analog TV viewing. FIG. 1 shows the typical topology of a two-way capable CaTV system. It consists of the CaTV H/E 101, and subscribers 104. The network topology is a tree-and-branch, which is an optimal topology for the distribution of a one way TV broadcast. The H/E 101 is located at the root of the tree while the subscribers 104 are located at the leaves of the tree. For increased signal quality, low maintenance, etc., the majority of the distance between the H/E 101 and the subscribers 104 is covered by fiber optic cables 106. A series of fiber nodes 102 are responsible for converting light signals to electromagnetic signals and vice-versa, for transmission over the coaxial cable region of the network 107. These dual medium CaTV plants are called hybrid fiber/coaxial (HFC).

Each fiber node 102 is at the root of a sub-tree that spans the subscribers in a logical neighborhood 105. A neighborhood 105 covers a few hundred subscribers 104. The coaxial cables that arrive at subscribers' homes carries signals in the frequency range of 5 MHz to about 750 MHz, or about 1 GHz in newer plants.

Data transmissions from cable modems to the H/E 101 typically occupy frequency bands in the range of 5 MHz to 42 MHz and are usually referred to as the upstream transmissions. Each such frequency band is also referred to as an upstream or return channel. Data transmissions from the H/E 101 to the cable modems typically occupy frequency bands in the region above 450 MHz and are usually referred to as the downstream transmissions. Each such frequency band is also referred to as a downstream channel.

During cable-modem power-on, the H/E 101 assigns to each cable-modem 104 a specific upstream channel, where they attempt all their message transmissions, and a specific downstream channel to receive all transmissions from the H/E 101. The message transmissions in both directions continue until H/E 101 decides otherwise. For ease of system management, cable-modems 104 that are assigned the same upstream channel are also assigned the same downstream channel.

To guarantee good signal quality and sufficient signal strength, bidirectional amplifiers 103 are added along the path from the CaTV 101 to subscribers 104. These amplifiers are bidirectional in the sense that operate over two distinct frequency regions, one that relates to upstream channels and one that relates to downstream channels.

While transmissions from the H/E 101 to stations, i.e., cable modems, on the downstream channel are under the exclusive control of the H/E 101, and thus well behaved and contention-free, coordinating transmissions from multiple stations to the H/E on an upstream channel is a more challenging task.

Unidirectional taps at each subscriber, disallow upstream transmission to be heard by other subscribers. Thus, on the one hand this increases the system security and privacy, on the other hand it guarantees that stations cannot communicate directly with each other, but they need to communicate through the H/E station via the help of an appropriate Medium Access Control (MAC) protocol, e.g., comprising a contention resolution component. Since, various stations cannot hear each other's upstream transmissions, during contention resolution, stations cannot listen for other transmissions prior to or during a message transmission of their own. As such, stations can coordinate their transmissions only under the explicit assistance from the H/E.

In order to communicate with the H/E, a cable modem needs to follow pre-established rules commonly referred to as a protocol suite. These rules regulate how the cable modem a. may format the digital information into meaningful information messages,
b. will transmit these messages on the cable plant,
c. will share the communication resource, i.e., the cable, with other subscribers' modems, etc.

A protocol suite comprises protocol layers like:

1. transport, describing the way that information from or to a subscriber forms data messages,
2. network, describing how messages travel and are routed through a communications network, 3. medium access (MAC), describing how messages share common communication resources,
4. physical, describing how a message is prepared for transmission on the communication medium, and etc.

The network topology and architecture of a CaTV system, does not allow subscribers' cable modems tc listen to each other's transmissions. Thus, the possibility exists that two or more messages transmitted by different cable modems to overlap in time and frequency with each other resulting in destruction of the information that these messages carry. Message transmission, free from interference from other message transmissions, is achieved by incorporating in the MAC protocol:

a. a contention/collision, resolution algorithm that is agreed upon and consistently executed by the cable modems, possibly facilitated by the H/E in order to resolve the message collisions; or
b. allowing the H/E to explicitly or implicitly poll stations to transmit; or
c. a combination of the a) and b).

Typically a data station is idle with nothing to transmit most of the time, thus polling stations for message transmissions could result in inefficient use of the communication resources, while active stations could experience a high delay until their turn comes to transmit. The low performance of a polling system, especially with low traffic loads, is exaggerated by the large round-trip propagation and message processing delays in a CaTV system, and the large number of subscribers attached to the CaTV system. More efficient CaTV system utilization is possible by permitting stations to transmit randomly and then utilize a contention resolution algorithm to cope with the possible message collisions.

Polling techniques work best at high traffic loads when most of the stations have something to transmit, while contention-based random access techniques work best at low to moderate traffic loads. Hence, hybrid solutions are most optimal for CaTV-based and other networks. In these networks, random access is used to register traffic load in a station to the H/E and then allow the H/E to poll only active stations on a contention-free basis, by reserving time intervals explicitly for given active stations. Message transmissions that result in collisions are referred to as contention-prone, while message transmissions that are guaranteed to be contention free are referred to as contention-free. Thus, in a network which operates with a hybrid MAC protocol, one can identify alternating contention-prone and contention-free operation phases during which contention-prone and contention-free message transmissions occur.

A good contention resolution algorithm results in an efficient use of network resources and in a fast resolution of possible collisions of simultaneously transmitted messages. Descriptions of contention resolution algorithms for multi-access computer communication can be found in the following references:

D. J. Aldous, "Ultimate instability of exponential back-off protocol for acknowledgment-based transmission control of random access communication channels," *IEEE Trans. on Information Theory*, vol. 33, no. 2, pp. 219–223, 1987;

D. Bertsekas and D. Gallager, *Data Networks*, 2nd. ed., Prentice Hall, 1992;

C. Bisdikian, "A review of random access algorithm," *Int'l Workshop on Mobile Communications*, pp. 123–127, Thessaloniki, Greece, September 1996;

L. Georgiadis and P. Papantoni-Kazakos, "A collision resolution protocol for random access channels with energy detectors," *IEEE Trans. on Communications*, vol. 30, no. I 1, pp—2413–2420, November 1982;

B. S. Tsybakov, "Survey of USSR Contributions to Random Multi-Access Communications," *IEEE Trans. on Information Theory*, vol. 31, no.2, pp. 143–165, March 1985;

P. Mathys and P. Flajolet, "Q-ary collision resolution algorithms in random-access systems with free or blocked channel access," *IEEE Trans. on Information Theory*, vol. 31, no. 2, March 1985;

L. Merakos and C. Bisdikian, "Delay analysis of the n-ary stack algorithm for a random access broadcast channel," *IEEE Trans. on Inform. Theory*, vol. 34, no. 5, September 1988;

L. Georgiadis and P. Papantoni-Kazakos, "Limited Feedback Sensing Algorithms for the Packet Broadcast Channel," *IEEE Trans. on Information Theory*, vol. 31, no. 2, pp. 280–294, March 1985; and;

W. Xu and G. Campbell, "A Distributed Queueing Random Access Protocol for a Broadcast Channel," *Computer Communication Review*, vol. 23, no. 4, pp. 270–278, October 1993.

Contention resolution is achieved by algorithms found in above references, by selecting appropriate retransmission time and by allowing the stations to retransmit repeatedly their collided messages at future times until these messages are successfully transmitted. The algorithms vary in the way that this retransmission time is selected. A station that has not yet successfully transmitted a message which has experienced a collision is called a "collided station", relative to this particular message. Similarly, the term "stations collide" describes stations that transmit messages that collide with each other.

According to a contention resolution algorithm's simplest form, a collided station, upon learning that its last message transmission resulted in a collision, randomly selects a waiting time interval and waits until this time interval expires before transmitting this message again. It is hoped that no other collided station selects a similar waiting time interval. The drawback of this simple algorithm is that even if two stations may not start transmitting at the same time, they may nevertheless still collide as long as one station starts transmitting while the other station still transmits.

Thus, to increase the efficiency of the algorithm, stations usually listen first and then wait for a transmission-free interval prior to their transmission. However, as previously mentioned, in a CaTV environment listening to other stations' transmissions is not feasible. Therefore, to decrease the possibility of collisions and thereby to increase the contention resolution efficiency, the transmission time axis is segmented into non-overlapping intervals large enough to accommodate a message transmission by a station. Stations are permitted to transmit only within the boundaries of these transmission intervals, thus messages can no longer partially overlap, they either overlap in their entirety or they do not overlap at all.

Two general classes of contention resolution algorithms are known in the literature. In the first class, usually referred to as the ALOHA class of algorithms, all collided stations following their collision, perform contention resolution against all active stations. This class of algorithms generally results in easier to implement algorithms, however, they are known to exhibit instabilities especially as the number of stations increases. For example, assuming a theoretically infinite number of stations, the number of stations waiting to transmit their message successfully increases without a bound independently of the traffic load. Advanced transmission control techniques are required in order to stabilize an algorithm within this class.

The second class of contention resolution algorithms is usually referred to as tree-search or stack algorithms because the contention resolution process can be graphically represented with the aid of a tree or a stack. In this class of algorithms, collided stations perform contention resolution only against the stations with which they have experienced a particular collision when all these stations transmitted in the same transmission interval. The contention resolution algorithms in this class generally result in relatively more complex, however inherently stable algorithms, and achieve substantially better efficiencies and delay characteristics than the algorithms of the first class. Hence, these algorithms are very attractive for data services that require low latency like real-time applications and/or high throughput like file data transfers.

Several tree and stack algorithms have been proposed in the open literature, referenced above. These algorithms pertain to the resolution of a contention that has occurred in a single transmission interval. Typically, in a tree-search algorithm, following a collision, the group of collided stations splits into a fixed number n of subgroups and contention resolution proceeds within each subgroup in sequence. L. Georgiadis and P. Papantoni-Kazakos, in "A collision resolution protocol for random access channels with energy detectors," *IEEE Trans. on Communications*, vol. 30, no. I 1, pp—2413–2420, November 1982., proposed a tree-search algorithm, a where stations that collide in a single transmission interval retransmit in the following transmission interval using a retransmission probability that depends on the number of stations collided during the first transmission interval.

W. Xu and G. Campbell, in "A Distributed Queueing Random Access Protocol for a Broadcast Channel," *Computer Communication Review*, vol. 23, no. 4, pp. 270–278, October 1993, proposed a tree-search algorithm for the resolution of collisions that occur over a fixed number m, m=2, 3, . . . , of successive transmission intervals, where the splitting parameter n is fixed and equal to m. The later situation attempts to take advantage of the long round-trip propagation delays in a CaTV network that may allow more than just a single transmission to be possible within a round-trip time. It should be noted that a station that transmits a message in a CaTV network needs to wait at least this round-trip time prior to it's next transmission, in order to learn the outcome of its original transmission.

Hybrid MAC solutions that combine both contention-prone and contention-free transmissions are preferred because of their good performance over all traffic loads. U.S. Pat. Nos. 4,736,371, 5,012,469 and 5,303,234 disclose hybrid MAC protocols using ALOHA-type contention resolution protocols that operate on a rigid, time-structured system that consists of a fixed size, successive time intervals, grouped into fixed size time frames. U.S. Pat. Nos. 4,745,599 and 4,774,707 describe hybrid MAC systems also using ALOHA-type contention resolution protocols. However, in these systems, contention-based transmissions can occur in asynchronous fashion in that, during asynchronous operating phases, transmissions from various stations start at random times. This simplifies the operation of a station but, at a cost of lower network efficiency due to wasted bandwidth from partially overlapped message transmissions.

Regarding hybrid MAC protocols that use tree-search based contention resolution protocols, U.S. Pat. Nos. 5,390, 181 and 5,590,131 propose hybrid MAC protocols with a rigid time-structure that consists of a repeated pattern comprised a fixed number N of fixed size successive transmission time intervals for contention-prone transmissions followed by a single fixed size transmission time interval for contention-free transmissions. The later U.S. Pat. No. 5,590, 131 is based on the first one U.S. Pat. No. 5,390,181 and on the related reference, W. Xu and G. Campbell, "A Distributed Queueing Random Access Protocol for a Broadcast Channel," *Computer Communication Review*, vol. 23, no. 4, pp. 270–278, October 1993, where extra algorithmic rules are added to reduce the number N needed to achieve a given performance level compared to the former patent. The marginal improvement in performance though may not support the added complexity due to the additional algorithmic rules.

What would be very beneficial is a way to further increase the MAC protocol efficiency and to increase the flexibility of the system operator to dynamically assign time intervals for contention-prone and contention-free transmissions.

SUMMARY OF THE INVENTION

The present invention is a communication system where a tree-search/stack class contention-resolution algorithm is employed. The contention-resolution algorithm in the MAC protocol is capable of operating and performing simultaneous contention resolutions over a variable number of transmission intervals, which may appear to float on the transmission time axis, without the requirement to appear periodically or in any particular predefined pattern. This provides sufficient flexibility to the system operators to place transmission intervals as they see fit, and to accommodate on-the-fly dynamically changing traffic demand for contention-prone and contention-free message transmissions. Moreover, the algorithmic parameters like the splitting parameter n, or admitted classes of traffic, can also be dynamically adjusted.

Therefore, the MAC protocol of the invention continuously adjusts to changes in traffic demands, dynamically shifting bandwidth between the contention-prone and contention-free operation phases to achieve optimal performance. This flexibility is achieved with low complexity at the stations with contention resolution assistance from the CaTV H/E, while balancing the complexity of the inventive MAC protocol between the monitor stations and the communicating devices.

The present invention relates to communication systems like an HFC-based CaTV data communication system employing contention-resolution algorithms of the hybrid MAC protocols for the second class, tree-search or stack algorithms, to resolve message transmission collisions. The stations, which are computer communicating devices, communicate by message transmissions over a communications channel where message contents of some of these transmissions are destroyed by collision of those messages sent from different stations. To resolve message transmission collisions, non-overlapping transmission time intervals (TTIs) of variable durations are generated and grouped into clusters of varying number of intervals and varying time distances between them. Sequences of clusters are formed in which any station transmitting in a particular TTI of a cluster in a sequence will learn of the status of its message transmissions before commencement of the next cluster from the same sequence. Moreover, stations colliding within the transmission intervals of a first cluster perform contention resolution along the sequence of clusters to which the first cluster belongs.

DETAILED DESCRIPTION OF THE INVENTION

Figure 1:
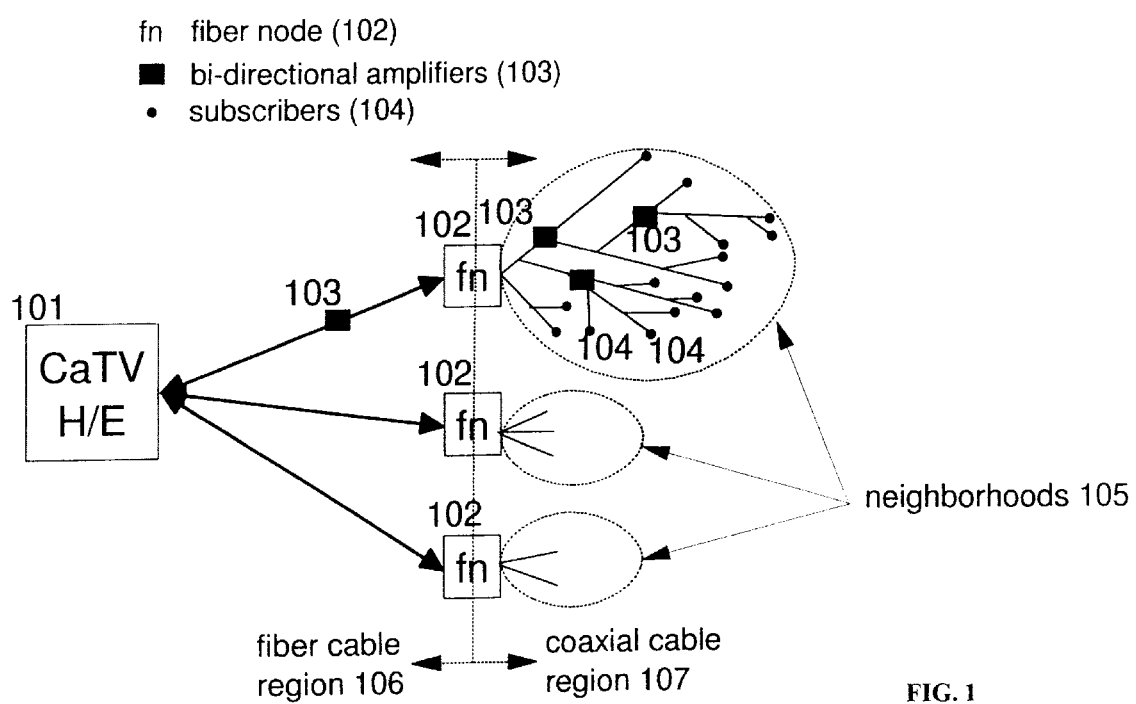
FIG. 1 is a chart representing the typical topology of a two-way capable CaTV system.

Although the present invention is described in terms of emerging data communication networks that are deployed on CaTV plants, this invention equally applies to other communication networks, including but not restricted to wireless networks, cellular networks, packet radio networks, wireless cable networks, satellite networks, infra-red communication systems, wire-line local area networks, etc. The system of the present invention can also be implemented over hybrid networks where the communication medium used for each of the two directions of the two-way communications could be different.

1st Preferred Embodiment

In the preferred embodiment, the present invention applies to data communication networks operating over two-way CaTV data systems, where the H/E aids in the contention resolution. The totality of the stations in a CaTV plant can be partitioned into groups of stations, each one of which transmits on a specific upstream channel. Typically, all such stations will also be assigned the same downstream channel, however the emphasis is put on how one of these groups of stations share the upstream channel. It is assumed that each time the station is concerned with the transmission of a particular message, however it should be understood that a station may transmit multiple messages at any time, and thus participate in multiple contention resolutions simultaneously. For that matter, there is not even the necessity to associate a contention resolution with a specific message. The station may be involved in three contention resolutions, because the station wants to transmit three messages, for example. Any time that it is the station's turn to transmit in any one of these parallel contention resolutions, it may decide to transmit any one of these three messages. To address the multi-contention resolution possibility within a station, each contention resolution process within each station proceeds independently, as if it was actually executed by another station, with the provision that the station should never attempt to transmit two of its own messages simultaneously.

Stations with nothing to transmit are called idle stations, otherwise they are called active stations. Stations that become active prior to their first transmission are called newcomers. Newcomers wait until the H/E notifies them of a sequence of time intervals over which they can transmit for the first time. The H/E provides this information within special control messages referred to as invitation messages and (retransmission allocation messages. After this sequence of time intervals information is conveyed to them by the H/E, the newcomer stations wait for the specified time intervals to come. When the time comes, randomly or according to possible further instructions from the H/E, the newcomers select one of these specified time intervals and transmit.

Following this transmission stations wait for the H/E to notify them of the outcome of their transmission. The outcome could be a success, a collision, or an idle, i.e., no stations selected to transmit in a particular transmission time interval, etc. Successfully transmitted stations can be considered as leaving the network and become idle or again become newcomers if they have a new message to transmit. Collided stations are notified of the collision and receive a unique collision identification (CID) from the H/E.

In the first preferred embodiment of the invention stations whose collision has been assigned a particular CID value are enabled to transmit in designated transmission intervals. This implies that each CID value in a (re)transmission allocation message enables (re)transmissions from a subgroup of stations whose outstanding collided messages have CIDs that relate to the CID according to an apriori defined rule. This rule may be static or dynamic in time and it is made known to the stations before they need to apply it. Examples of such priority rules are:

a station's collision id, $CID_{st}$, should be the same as the CID in the (re)transmission allocation message (described in the following embodiment);

a station's collision id, $CID_{st}$, should satisfy $CID_{st} \geq CID$; and any other rule specified by the system designer.

Collided stations store the CID assigned to their collision and wait until the H/E allows stations with a specific CID to transmit again when the time arrives, the H/E will send a message notifying the rule according to which stations with a given CID can retransmit in a given transmission interval, e.g., the rule may specify with what probability a station will transmit. Following this transmission, the process repeats itself until the collisions are resolved and all stations transmit their collided messages successfully.

Since, the algorithms discussed are tree-search type, a given CID should not be reused, i.e., reassigned, until all the stations whose most recent transmission resulted in a collision to which this CID was assigned, retransmit at least once. Thereby, the H/E controls which particular group of collided stations can attempt retransmissions during specific time intervals, resulting in very efficient, flexible and powerful contention resolutions.

In the network all stations are assumed to have a common understanding of time, and know when a transmission time-interval starts and how long it lasts, because transmissions occur during designated time-intervals. During the initialization and throughout the operation of the communication system, a monitor station guides all stations in a way that all of them will interpret time-intervals identically.

In the case of a CaTV network, the H/E plays the role of the monitor station that establishes the common time reference across the whole network. In particular, when referring to transmission interval x, described by its beginning time $t_b$ and end time $t_e$, means that transmissions within interval x will arrive at the H/E during the H/E times $t_b$ and $t_e$.

Internal clocks of stations may be time adjusted to counter propagation delays between stations and the H/E station, so that any transmission from any station that starts at the beginning of interval x will arrive at the H/E station when the H/E station's clock shows $t_b$.

Stations may transmit on a contention basis with the possibility of interfering with other stations' contention-prone transmissions, or transmit on a contention-free basis, referred to as reservation-based transmissions. Presently the focus is on contention-prone transmissions on specially designated contention-prone transmission time intervals. Commonly these time intervals are of fixed duration and referred to as slots.

Figure 2:
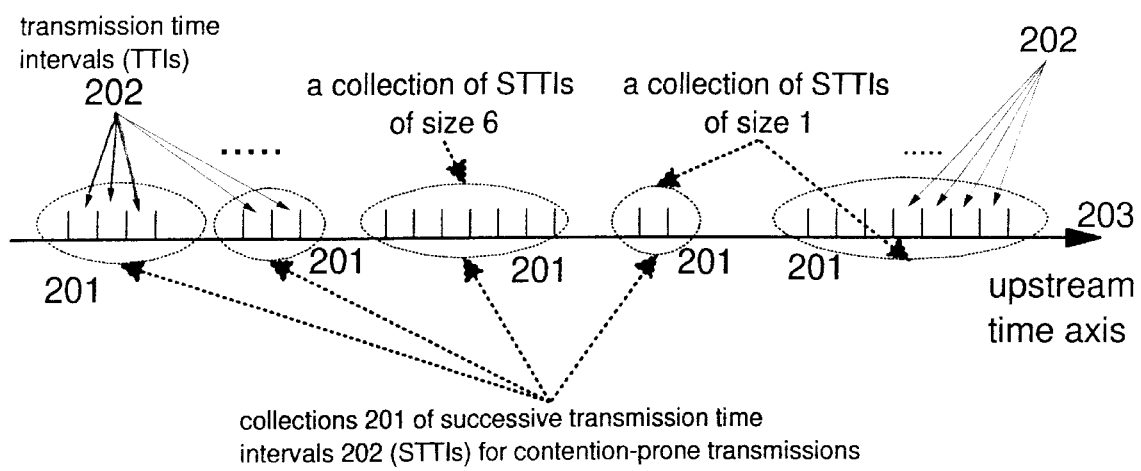
FIG. 2 is a linear graph showing collections of successive contention-prone transmission time intervals scattered on the upstream time axis.

FIG. 2 shows collections 201 of successive contention-prone transmission time intervals 202, scattered on the upstream time axis 203, where the upstream message transmissions occur. Individual transmission time intervals 202 may or may not be of equal duration. For the operation of the system, these potentially scattered transmission time intervals 202 and/or collections of transmission time intervals 201 need to be partitioned and grouped in sequences of clusters of transmission time intervals 202 in such a way that any contention resolution performed for collisions that have occurred in one cluster from a sequence of clusters of transmission time intervals continues in the transmission time intervals of the following cluster of the same sequence of clusters of transmission time intervals. The size of a collection 201 of successive contention-prone transmission time intervals 202, is the number of successive transmission time intervals in the cluster.

Figure 3:
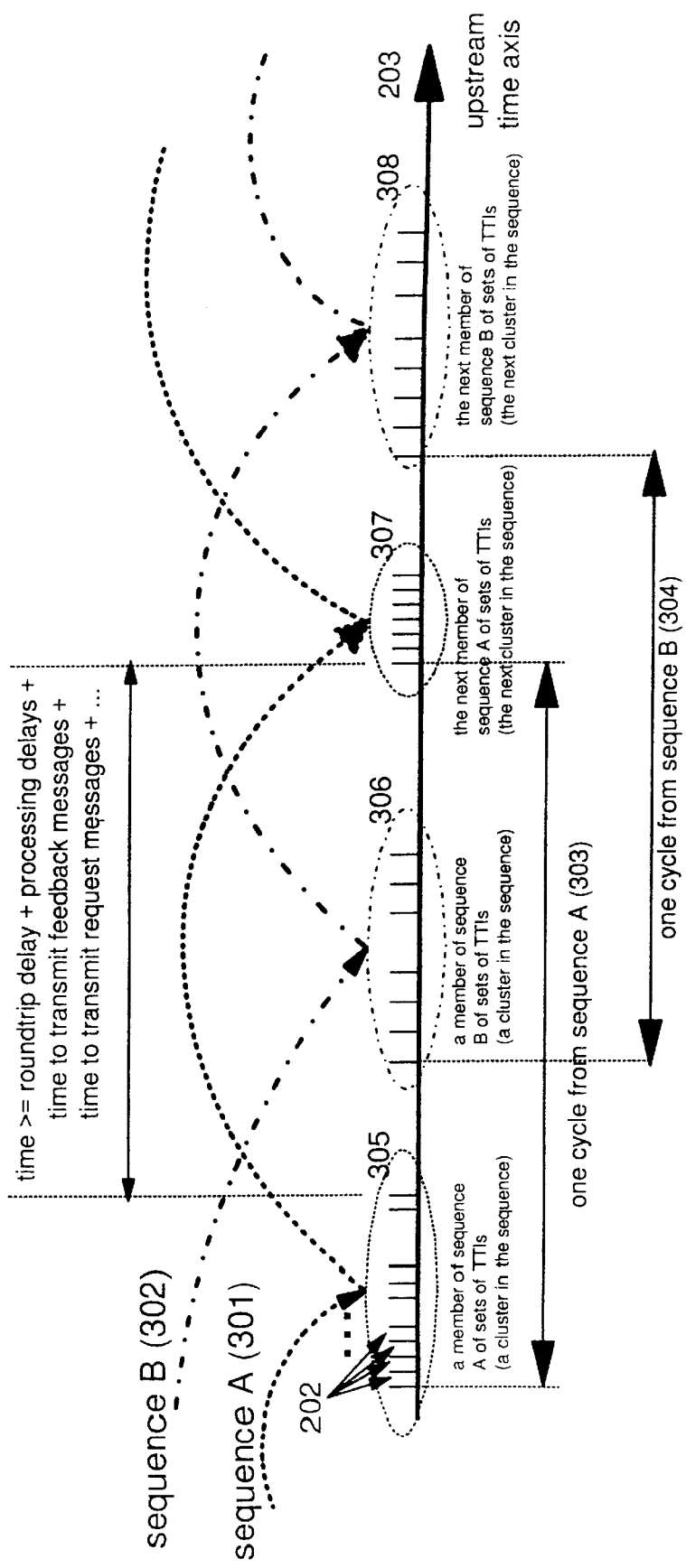
FIG. 3 is a linear graph showing sequences of clusters of varying successive contention-prone transmission time intervals scattered on the upstream time axis.

FIG. 3 shows the transmission time intervals 202 grouped in clusters of transmission time intervals 305–308. The clusters are further grouped into two sequences of clusters of transmission time intervals A 301, B 302. Two independent contention resolution processes are executed simultaneously. One process is executed strictly in the transmission time intervals of sequence A 301, while the other process is executed strictly in the transmission time intervals of sequence B 302. No restriction is imposed on whether time intervals from different sequences of clusters of transmission time intervals 202 mingle with each other.

As the example shown in FIG. 3 indicates, each cluster, i.e., a member of a sequence of clusters 301, 302, comprises an assembly of one or more collections of successive transmission time intervals. For example, the cluster 305 of sequence A 301 consist of seven transmission time intervals 202 grouped in three collections of successive transmission time intervals of sizes 4, 2, and 1, while the next cluster 307 of sequence A 301 consists of 6 transmission time intervals 202 grouped in a single collection of successive time intervals of size 6.

A cycle in a sequence denotes the time elapsed from the beginning of the first transmission time interval of a cluster until the beginning of the first transmission time interval of the next cluster from the same sequence. Alternatively, the cycle could denote the time elapsed from the end of a cluster to the end of the next cluster. Preferably, the contention resolution algorithm employed in this invention is an iterative one, with each iteration coinciding with one cycle of the corresponding sequence over which the algorithm controls the contention resolution.

The duration of a cycle may vary from one cycle to the next, however as shown in FIG. 3, physical and other parameters impose a minimum time distance between clusters of a sequence. For instance, the minimum time distance may depend on a. the maximum round-trip propagation delay,
b. the processing delay at the H/E to analyze the outcome of transmissions within a cluster of transmission intervals,
c. the time to transmit by the H/E the feedback information regarding the outcomes of these transmissions,
d. the time to transmit the (re)transmission allocation messages that will designate the time intervals of the next cluster of transmission time intervals, and
e. other processing times at the H/E and the station, etc.

A station that does its contention-prone transmissions and retransmissions in a sequence will do at most one transmission per cluster of this sequence, i.e., per cycle, for each particular message that it attempts to transmit in this sequence. Nevertheless, the station is not necessarily required to know anything about sequences and clusters. The H/E station keeps track of this and notifies the station to transmit when the time comes. The clusters of a sequence are key elements for the iterative contention resolution algorithm presented shortly. Transmissions in one cluster of transmission time intervals analyzed together and their outcomes, effects which stations will retransmit in the next or later clusters of this sequence.

Contention resolutions occur independently within each sequence, the execution of a single contention resolution within a single sequence of clusters of transmission time intervals is considered next. In an extreme case, entirely different contention resolution algorithms may be executed for each sequence.

In the first preferred embodiment of the invention, communicating devices, e.g., stations, perform the following five-step process to transmit their contention-prone messages:

a. a station is in idle state;
b. the station becomes active, i.e., becomes a newcomer, and waits to be allowed for its first transmission;
c. following transmission the station waits for feedback information regarding its transmission;
d. if a collision occurs, the station waits to be allowed for a retransmission;
e. the process iterates from step c) until the station successfully transmits its message.

Figure 4:
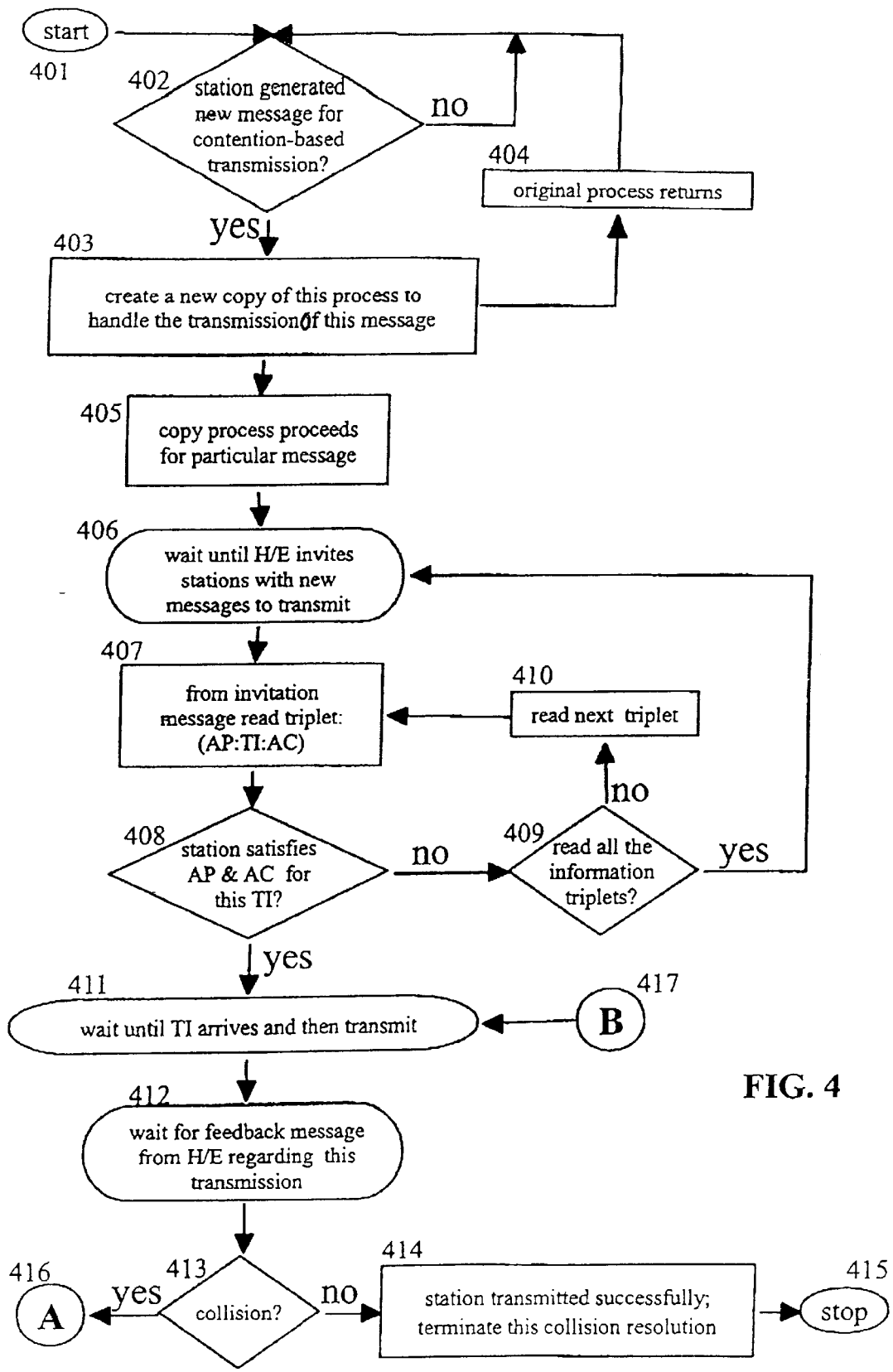
FIG. 4 is a flowchart of an algorithm which guarantees an expedited and fair message transmission of an embodiment of the present invention.
Figure 4:
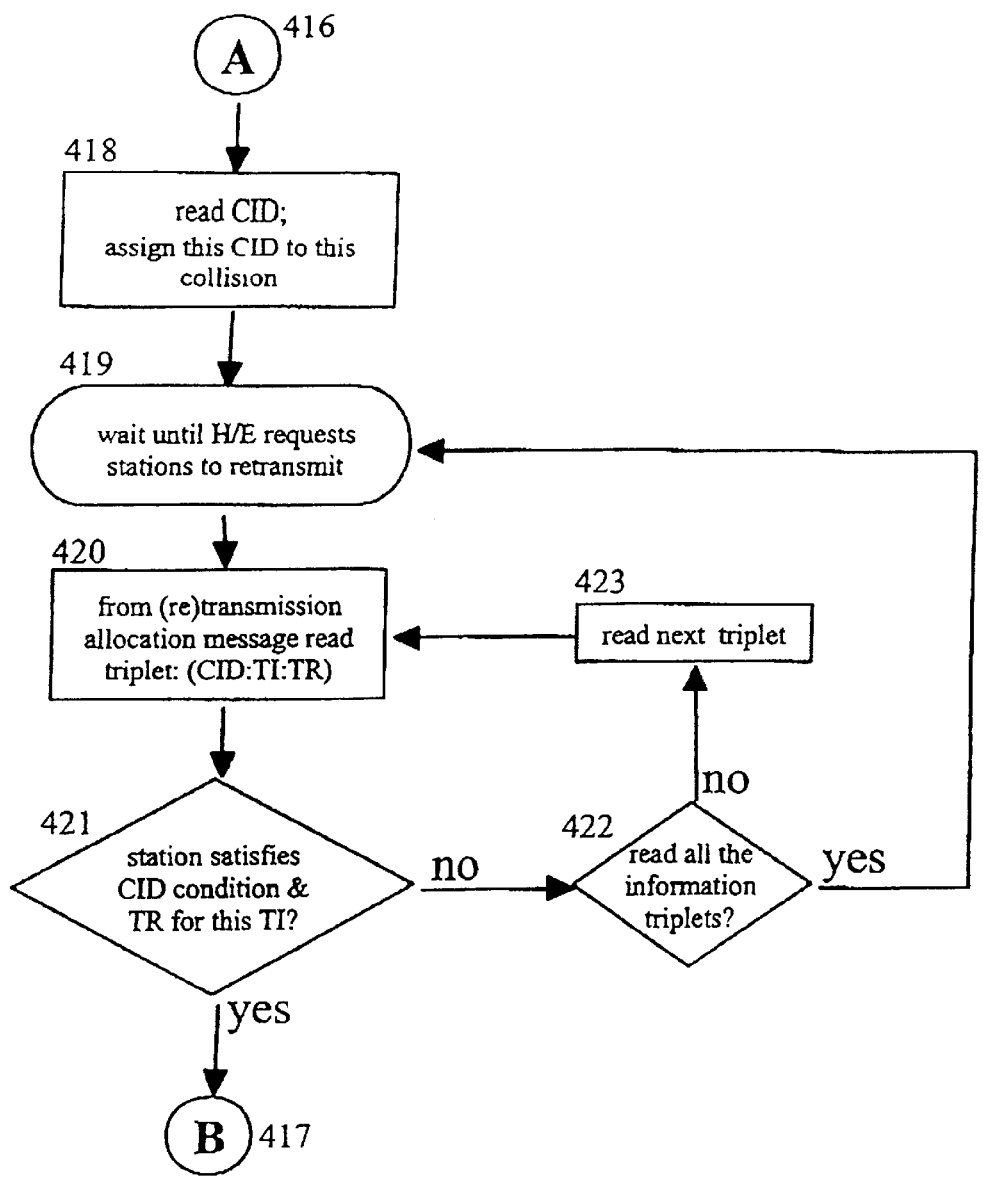

FIG. 4(a) shows a series of algorithmic steps taking place within each step to guarantee an expedited and fair message transmission. After an initializing step 401 at an idle station, a loop is performed at step 402 until it is determines that there is a message to transmit (in contention-mode). When such a message is generated, a copy of this algorithmic process is created in step 403 to deal with the transmission of this message. At step 404 the original process returns to prepare the station for the transmission of yet another message (in contention-mode). The copy process proceeds at step 405.

The station with the new message to transmit, a newcomer station, waits to receive a transmission invitation message from the H/E 406. This invitation message may contain the following information fields:

I. Admission Property (AP): Only newcomers that satisfy this "Property" should be concerned with the following information. The property could be associated with the transmission priority of a newcomer's traffic level, e.g., high, low, etc., or the identification of a specific group of stations, etc. Where no "Admission Property" restriction is desired this field may not be necessary.

II. Transmission Interval (TI): The time interval that the newcomers can use to transmit for the first time.

III. Admission Constraint (AC): Of all newcomers 3—, that satisfy the "Admission Property" only those that also satisfy this AC can transmit in the TI.

AC may represent a time interval for which only stations that have generated traffic in a particular time period are allowed to transmit, or it may represent a portion for which only, say, 30% of the newcomers are allowed to transmit, in which case a newcomer has to randomly select whether it can transmit or not. Where no AC restriction is desired this field may not be necessary.

The invitation message sent by the H/E may contain several triplets of (AP:TI:AC) information fields, one for each transmission time interval. Alteratively, several TI fields may be combined in the form of "Starting Transmission Interval" and "Ending Transmission Interval" fields, if the AP and AC fields are the same for a number of TIs. Other combinations of this information field triplet may be possible. An invitation message may be sent by the H/E on its own, or within other messages that contain additional information. The functionality performed by the (AP:TI:AC) information field triplets may be achieved with more or less than three fields, depending on specific design choices.

Following the receipt of the invitation message, the admission information triplet (AP:TI:AC) is read at step 407. If the station satisfies the AP and AC conditions 408, it waits until the time interval TI arrives before it transmits its message, as indicated at step 411. If the station does not satisfy the AP and AC conditions for the given time interval TI, at step 409 a determination is made whether the invitation message contains additional (AP:TI:AC) information triplets. If there are more, the next one is read at step 410 and the control is returned to step 407. If there are no more (AP:TI:AC) information triplets remaining, the station returns the control to step 406 to wait for the next invitation message.

Following a transmission by a newcomer station at step 411, or a retransmission by a previously collided station, outcome of step 417 (FIG. 4(b)), the station waits to be notified of the outcome of the transmission at step 412. The transmission notification message sent by the H/E, referred to as the feedback message, may contain the following information fields:

I. TI: The following information pertains to the transmissions that have occurred in this time interval.

II. Transmission Status (TS): Information on whether a transmission resulted in a collision.

III. CID: Where the transmission resulted in a collision, CID is assigned to this collision.

A feedback message may contain several triplets of (TI:TS:CID) information fields, each one of which corresponds to the outcome of transmissions in the specified time interval. Just like with invitation messages, a feedback message may be sent by the H/E on its own, or within other messages that contain additional information. In view of the fact that the CID is really needed only when there is a collision, the CID and the TS fields may be combined into one field. In that one field a specific value of the CID may indicate the presence of no collision, while any other value of the CID may imply both the presence of a collision and also its assigned CID.

The H/E may want to explicitly acknowledge a successful transmission, either by using a reserved CID value, and/or explicitly replying to the transmitting station, assuming that the station transmission contains its address. This, however, is not always necessary since a successful transmission commonly implies that only one station transmitted in a transmission interval. Hence, if this interval is signified as containing no collision, the transmitting station can infer that its transmission was successfully received by the H/E. Following its successful transmission, the station terminates its current contention resolution process and prepares itself for future transmissions.

Practically, the CID value will range between a minimum value, $CID_{min}$, and a maximum value, $CID_{max}$, where $CID_{max}$, is greater or equal to $CID_{min}$. The range of these CID values may depend on the maximum number of stations expected to be connected into the communications network, on CID field size constraints, or may be deliberately chosen for any reason. Whenever the H/E runs out of unassigned CIDs, it may choose to reuse already assigned CIDs and treat the corresponding collisions together with the collisions that received the original CID. In the case where $CID_{min}=CID_{max}$, no explicit use of CID is, necessary.

Again, the functionality performed by these information field triplets (TI:TS:CID) may be achieved with more or less than three fields, depending on specific design choices.

After receiving the feedback information, at step 413, a determination is made by the station whether the TS field that corresponds to its transmission in the time interval TI indicates a collision. If no collision Ls indicated, then the message has been successfully transmitted at step 414 and the copy of the contention resolution process is terminated at step 415. As shown in FIG. 4(b), if a collision has occurred, the corresponding CID field is read by the station at step 418, from the feedback message and assigns this CID to its collision.

Following a collision, stations that collided, and were assigned a particular CID, wait until the H/E notifies them via a (re)transmission allocation message, when they can transmit again at step 419. The (re)transmission allocation message sent by the H/E read at step 420 may contain the following information fields.

I. CID: Only stations whose most recent transmission resulted in a collision which was assigned this CID, should be concerned with the following information fields.

II. TI: The Transmission Interval in which stations whose most recent transmission resulted in a collision which was assigned this CID may attempt to retransmit.

III. TR: The Transmission Rule for regulating which particular stations, whose most recent transmission resulted in a collision, which was assigned this CID can retransmit in the TI. The TR may be simply a percentile of the collided stations or a time period signifying that only stations whose collided traffic was generated within the specified time period can transmit, etc.

The (re)transmission allocation message may contain multiple pairs of (TI:TR) information fields, one for each transmission interval defined by this (re)transmission allocation message and for a given CID, it may contain multiple groups of CID and associated (TI:TR) information fields. A (re)transmission allocation message may be sent by the H/E on its own, or within other messages that contain additional information.

To guarantee that all collided stations whose most recent collision has been assigned a particular CID value retransmit, the H/E ensures that for each CID it will devote two or more of TTIs in a manner such that the associated TR fields will cover all collided stations with this CID. For example, for each CID, the H/E may assign three transmission intervals and require the stations with this CID to select one of these three transmission intervals with probability of ⅓.

If the TR is fixed, is known and does not change with time, e.g., when there are always a fixed number of transmission intervals assigned for retransmissions and each collided station can choose with equal probability one of them, the TR may not be required to be explicitly sent by the H/E. In this case, the associated TIs may be sent simply in the form of "Starting Transmission Interval" and "Ending Transmission Interval." Other equivalent combinations of the CID and (TI:TR) information fields may be possible without violating the scope of the invention. The functionality performed by these information field triplets (CID:TI:TR) with more or less than three fields may be achieved depending on specific design choices.

Referring to FIG. 4(b), after the triplet (CID:TI:TR) from the (re)transmission allocation message is read at step 420, a determination is made at step 421 whether the CID and TR conditions for this TI are satisfied. If the CID and TR conditions for the given time interval TI are not satisfied, a determination is made at step 422 whether the (re)transmission allocation message contains additional (CID:TI:TR) information triplets or any additional (TI:TR) pairs associated with a particular CID. If there are more, then the next such information fields are read at step 423 and the station returns back to step 420. If there are no more (CID:TI:TR) information triplets or (TI:TR) pairs remaining, the station returns back to step 419 to wait for the next (re)transmission allocation message.

If the CID and TR conditions for the given TI are satisfied, the whole contention resolution process is repeated at step 417 by returning the station back to step 411.

2nd Preferred Embodiment

A very large family of multi-slot, dynamically changeable, tree-search type contention resolution protocols may be implemented based on the specific interpretation of the information fields discussed. A preferred embodiment of a specific contention resolution protocol is discussed below. The parameters used in the discussion of the embodiment are for illustration purposes only, and different parameter combinations may be chosen without violating the scope of the embodiment or of the 1st preferred embodiment presented earlier.

The operation of the system will be presented under normal operating conditions assuming that no errors occur during the transmission of messages, other than the ones that are the results of collisions and none of the steps presented above are omitted. If errors occur, simple error recovery techniques may include: the return to the idle state for a station that does not receive a CID following a collision, for example, or, following the expiration of a time-out period during which the H/E does not request collided stations with a particular CID value assigned to their collision, to retransmit.

Under certain conditions, the station may decide to use a different CID value than the one designated for its collision, and continue contention resolution with that CID value. Such situation may be permissible only if the CIDs are allocated according to a well known rule and the station chooses a CID value that will not give it an unfair advantage during contention resolution.

Figure 5:
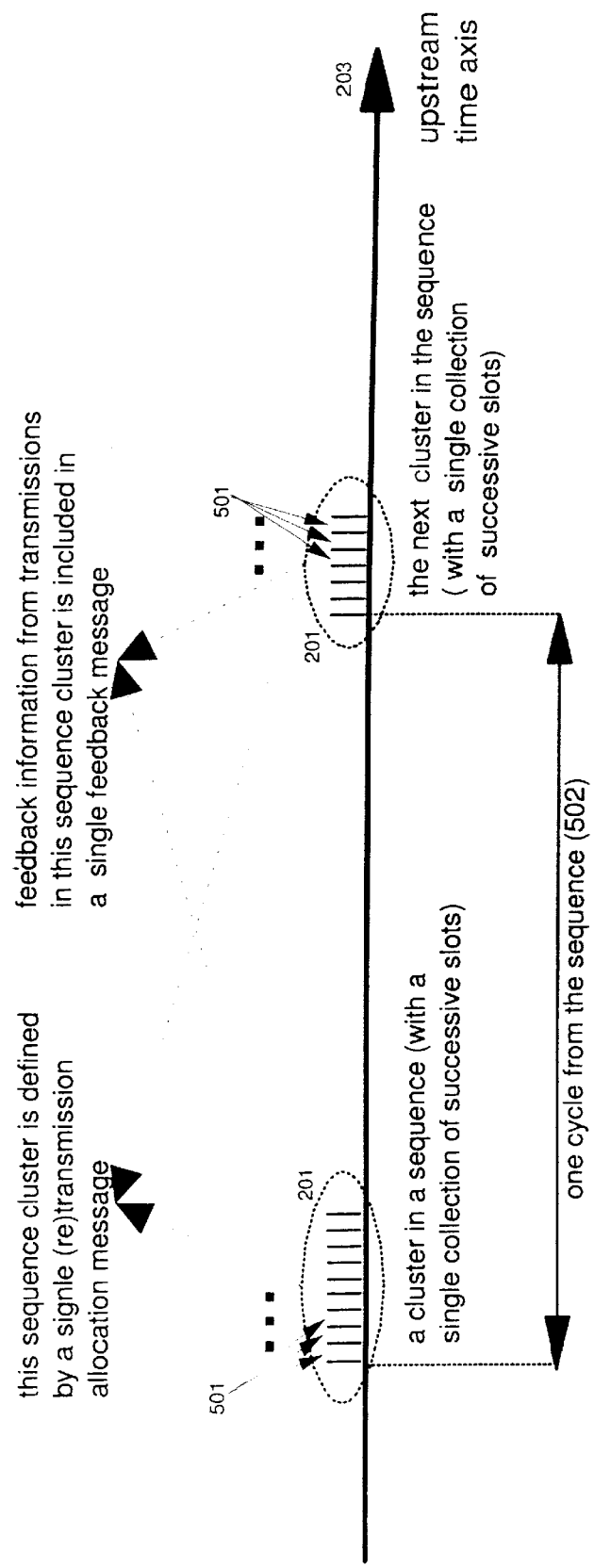
FIG. 5 is a linear graph showing a single sequence of clusters of successive slots of constant duration.

For this embodiment, all transmission time intervals previously mentioned are assumed to be of equal length taken as a unit of time and will be referred to as slots. Slots will be indexed with the integers 0, 1, 2, 3, . . . and slots in each cluster of a sequence of clusters of slots are assumed to be successive, i.e., clusters in each sequence contain exactly one collection of successive slots. FIG. 5 shows a single sequence of clusters 201 of successive slots 501 of constant duration. Each cluster comprises a single collection of successive slots. One cycle 502 of the sequence is also shown.

Due to physical limitations, continuous count is impossible, it is assumed that there exists a sufficiently large number M, beyond which time wraps around, i.e., time is counted as

. . . M-3, M-2, M-1, 0, 1, 2, . . . .

For the purpose of this example, time will be described in a field requiring 32 binary digits/bits, i.e., M is equal to $2^{32}$=4,294,967,296. In addition, invitation messages may be sent within (re)transmission allocation messages. Means are provided within a (re)transmission allocation message, to identify the portion of the message which contains the invitation related information and the retransmission/CID related information. The (re)transmission allocation message comprises bit fields providing the following information:

I. Admission Property: The message traffic generated in the system belongs to 8 priority levels, indexed in an increasing priority as 1, 2, . . ., 8. Whenever the H/E wants to allow newcomers in the system, it denotes in a 8-bit "Admission Property" field which priority level messages will be allowed in which slots. In particular, a priority x message, where x ranges from 1 to 8 inclusive, will transmit in those slots that correspond to the rightmost "1" in the "Admission Property" field whose position is not to the right of position x in the field when counting the bit positions as 1, 2, . . . , 8 from left to right. For example, if the 8-bit "Admission Property" field shows 11010000, then the stations will know that there are three groups of slots, specified in the current (re)transmission allocation message, to accept newcomers. In particular, the first such group of slots will pertain to the lowest priority 1 newcomers exclusively, the second will pertain to priority 2 and 3, while the third will pertain to priority 4 and higher. Because of the "0" in the third position, priority 3 newcomer traffic does not have its own group of slots, but it is lumped with that of priority 2 newcomer traffic. Similarly for newcomer traffic that belongs to priorities 4 and higher.

II. Invitation message information: Whenever the 8-bit "Admission Property" field is null, i.e., 00000000, this (re)transmission allocation message does not contain any newcomer invitation information.

III. Transmission Interval.—An 8-bit number representing the number of successive slots, to be used by the particular group of newcomers. It is assumed that newcomers randomly select any of these slots for their first transmission. Clearly, the absolute time of the first of transmission intervals must be provided to assist the station in determining the absolute time of any subsequent time interval within the same cluster.

IV. Admission Constraint: representing a time boundary defined whereby only newcomer stations with an allowable priority traffic that generated traffic prior to this time boundary are allowed to transmit. Alteratively, a percentile is provided by the H/E, in which case stations will need to randomly select whether they are eligible for their first transmission.

V. CID: The 8-bit CID field that directs stations whose most recent transmission resulted in a collision which was assigned this CID value to prepare to retransmit in a slot defined by the (re)transmission allocation message. Each CID value is assigned by the H/E in a feedback message following a transmission. It is assumed that CIDs are assigned values in the range 1, 2, 3, . . . ; CID=0 is reserved to be used to denote a slot with no collision. A CID value will not be reused until all stations whose most recent transmission resulted in a collision which was assigned this CID retransmit at least once. The transmission rule described next, guarantees that all collided stations will (re)transmit again.

An 8-bit CID field allows the resolution of an original collision of more than $2^{255}$, approximately $5.7*10^{76}$, messages before running out of CID values. For each CID field denoting a collision, the following taco fields are also provided:

i. Transmission Interval: TI(CID) A 4-bit number representing the number of slots to be used for the retransmissions by the stations whose most recent transmission resulted in a collision which was assigned this CID; and ii. Transmission Rule: TR(CID) A 4-bit number representing the split parameter. In principle, each station, whose most recent transmission resulted in a collision which was assigned this CID selects a number k between 1 and TR(CID). If k is larger than TI(CID), the station waits until the next time the H/E specifies retransmission slots for the given CID. If k is less or equal to TR(CID), the station transmits in the k-th slot from these TI(CID) slots.

Figure 6:
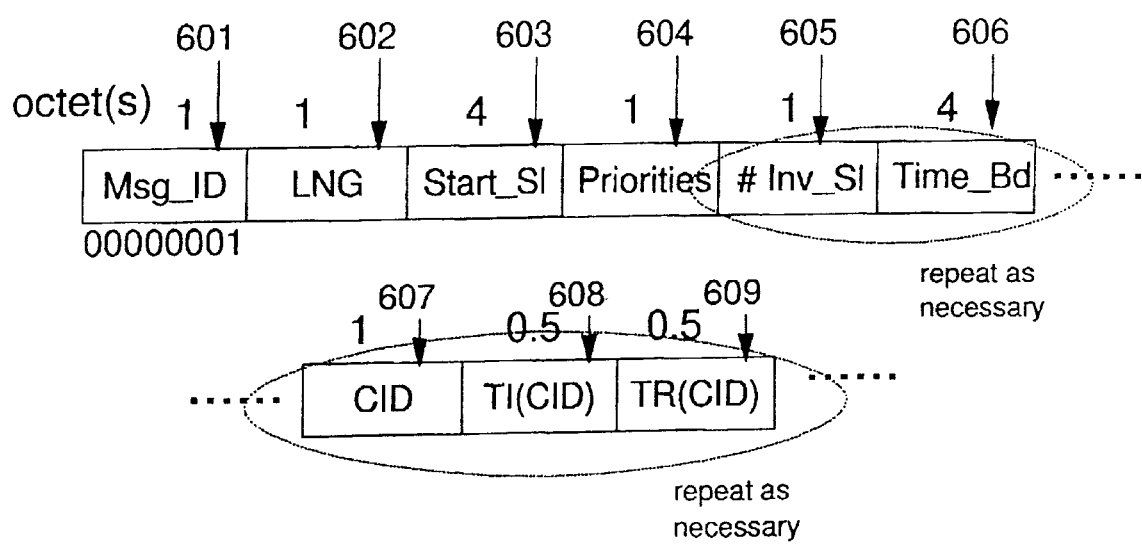
FIG. 6 is a diagram depicting the composition of a (re)transmission allocation message.

A more detailed description of the (re)transmission allocation message fields considered in this example embodiment is shown in FIG. 6 depicting an actual formatting of a (re)transmission allocation message. Assuming that a single (re)transmission allocation message defines all the contention-prone slots 501 (FIG. 5) in a single cluster of slots 201 (FIG. 5). The (re)transmission allocation message has the following fields:

Field 601, Msg_ID (1-octet, i.e., 8 bits): Contains a unique message id to identify this message as a (re)transmission allocation message. In FIG. 6 this id number is the binary number "00000001."

Field 602, LNG (1-octet): Contains the total length in octets of this message. Because the (re)transmission allocation messages are not necessarily of fixed size, the length field aids stations to identify the end of a (re)transmission allocation message.

Field 603, Start_S1 (4-octets): Identifies the absolute time that corresponds to the first slot in the cluster identified by this (re)transmission allocation message. The rest of the slots in this cluster are identified relative to this slot in an additive manner, i.e., for each specific slot within groups of slots defined by this message, the number of all slots in these groups defined prior to the group containing each specific slot is first added to the Start_S1 value.

Field 604, Priorities (4-octets): Contains the "Admission Property" as described before. For each non-zero element of this field there are additional 5-octets 605–609.

Field 605, #Inv-S1 (1-octet): Incremented by 1, this field includes the number of "invitation slots", e.g., a group of slots, to be used by the group(s) of newcomers allowed by the corresponding "1" in the Priorities field 604. At least 1, and up to 256 successive slots can be assigned for newcomers with this field.

Field 606, Time-Bd (4-octet): Only messages from newcomers, identified by the corresponding "1" in the Priorities field 604, that have been generated prior to the Time_Bd 606 time boundary will be transmitted in any of the 1+#Inv-S1, field 605 slots selected with equal probability.

Field 607, CID (1-octet): Identifies the group of collided stations that will be using the TI(CID) slots 608 for their retransmissions.

Field 608, TI(CID) (4-bits): Incremented by 1, contains the number of slots to be used for the retransmissions of stations whose most recent collision was assigned this CID. At least 1 and up to 16 slots can be thus assigned, and the subgroup of the allowable stations that also "pass" the retransmission rule TR(CID) will select any of these slots with equal probability.

Field 609, TR(CID)(4-bits): Incremented by 1, this field contains the splitting parameter to be used for selecting transmission in the (1+TI(CID)) slots. TR(CID) is always equal or larger than TI(CID). Each station that may be allowed to transmit in the (1+TI(CID)) slots would select to do so with probability $(1+TI(CID))\div(1+TR(CID))$, while will defer transmission with probability $1-[(1+TI(CID))\div(1+TR(CID))]$. If it selects to transmit, then it will select to transmit in any of the (1+TI(CID)) slots with equal probability.

If the Priorities field 604 has x 1s, where x ranges from 0 to 8 inclusive, then there are also x pairs of "#Inv_S1:Time_Bd" fields 605, 606. Thus, also, LNG=7+5x+2y, where y is the number of CID:TI(CID):TR(CID) fields 607–609. Hence, given LNG and x, from the Priorities field 604, y can be calculated as y=0.5(LNG−7−5x).

If multiple sequences are allowed, then a sequence id field may be added.

The slot information fields for newcomers, i.e., #Inv_S1 605 and Time_Bd 606, are ordered from left to right for increasing transmission priority, however, this order can be reversed as long as in a particular implementation of this system this is known beforehand, so all the stations and the H/E have uniform interpretation of the priority order of these fields.

To find out whether the station can transmit in the current cluster of slots some decisions need to be made. First, station's collision must have a CID that coincides with the one provided in the current (re)transmission allocation message, or it must be a newcomer with a message of priority level belonging to the ones allowed by the Priorities field 604. In the latter case, a station may transmit only if its messages satisfy the Time_Bd field 606 restriction. If the station is eligible to transmit it may need to randomly select on which particular slot it can transmit, which requires the use of a random number generator.

Let rand(N) denote the outcome of a random number generation with range the integers 1, 2, ..., N, i.e., rand(N) ranges from 1 to N inclusive. Then, rand(1+#Inv_S1) will identify the slot out of the (1+#Inv_S1), a newcomer with the appropriate permissions can transmit. To select to retransmit with probability $(1+TI(CID))\div(1+TR(CID))$, or not with probability $1-[(1+TI(CID))\div(1+TR(CID))]$, a station needs only compare (1+TI(CID)) with rand(1+TR(CID)); as discussed above, the contents of the TI(CID) and TR(CID) fields need to be incremented by 1 prior to interpreting them. If rand(1+TR(CID)) is smaller or equal to (1+TI(CID)), then it can randomly transmit in any of the (1+TI(CID)) slots; it can actually transmit in slot rand(1+TR(CID)) counting them from the first slot in the group of slots designated for this CID group of collided stations by the current (re)transmission allocation message. On the other hand, if rand(1+TR(CID)) is larger than (1+TI(CID)), the station is not allowed to transmit in the current cluster. In the latter case, the H/E assigns additional slots in subsequent clusters where the remaining stations with this CID will be allowed to transmit.

All collided stations whose most recent transmission resulted in a collision and has an assigned CID are guaranteed a retransmission. As mentioned before, the H/E will not reassign a given CID value to any other collision, without first allowing all the stations whose most recent transmission resulted in a collision with this CID to retransmit.

Refering back to FIG. 6, the selection of the #Inv_S1 605, TI(CID) field 608, and TR(CID) field 609 is made by the H/E with each new (re)transmission allocation message. The selection of these parameters can be dictated by knowledge, or by an estimate of the traffic conditions on the network, or, by a splitting strategy. For example, in the simplest case, the splitting parameter may be fixed, e.g., TI(CID)=TR(CID)=2. On the other hand, if the H/E can estimate that a collision contained at least k transmissions, it may request that when these stations retransmit do so with probability that depends on k, for instance 1/k. For example, this can be achieved by setting TI(CID)=TR(CID)=k−1. Also, under high traffic loads and when a contention resolution is in its early stages, the H/E may want to "spread" the collided stations to more slots, thus using a large TR(CID). Then, as the collision advances, anticipating that fewer and fewer stations will be involved in retransmitting in a particular slot, the H/E may decrease the parameter TR(CID) to avoid unused slots, hence, increasing system utilization.

The intended use of TR(CID)s may also change as knowledge is gained from the partial transmission of stations whose most recent transmission resulted in a collision and were assigned this CID. This can occur in situations where the number of slots in a cluster is not sufficient to accommodate the retransmissions of all the stations with the same CID value assigned to their most recent collision, some of whom need to wait for a following cluster to transmit.

As an example, assuming that stations whose most recent transmission resulted in a collision and were assigned the CID=5, are to be split in three subgroups requiring three slots for their transmission. Suppose further that, in the current cluster, only 2 of these three slots can be accommodated, i.e., for the current cluster the H/E has already sent a (re)transmission allocation message contained the information (CID=5:TI(5)=1:TR(5)=2). Thus, only ⅔ of the stations whose most recent transmission resulted in a collision and they were assigned the collision id 5 will transmit. As previously discussed, the contents of the TI(CID) and TR(CID) fields need to be incremented by 1 prior to interpreting them.

It follows that the H/E allows the remaining ⅓ of these stations to transmit in a following cluster, from the same sequence that the current cluster belongs to, in which the H/E will send a (re)transmission allocation message normally containing the information (CID=5:TI(5)=0:TR(5)=0). However, if it is assumed that no station transmitted in the two slots of the current cluster where CID=5 stations transmit, then it is guaranteed that a collision will occur in the remaining one slot of the following cluster where CID=5 stations can transmit again. Having acquired this knowledge and to avoid this assured collision, the H/E may send in the following (re)transmission allocation message the information (CID=5:TI(5)=2:TR(5)=2), instead of the originally anticipated (CID=5:TI(5)=0:TR(5)=0).

Figure 7:
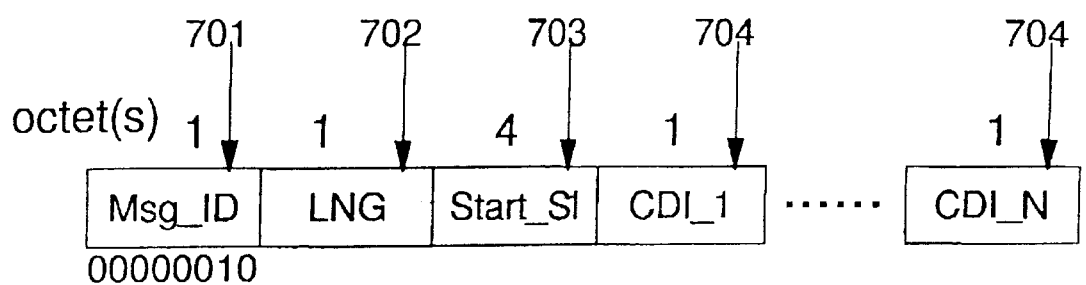
FIG. 7 is a diagram depicting a feedback message.

Following a transmission, a station awaits to be notified by the H/E of the outcome of this transmission via a feedback message shown in FIG. 7, and, in case of a collision, have its collision assigned a CID. A single feedback message comprises the transmission status, CID, and all other related information, from all transmissions in a cluster of contention-prone slots 501 (FIG. 5) in a single cluster of slots 201 (FIG. 5). The feedback message has the following fields:

Field 701, Msg_ID (1-octet): Contains a unique message id to identify this message as a feedback message. For the feedback message of FIG. 7 this id number is the 8-bit binary number 00000010.

Field 702, LNG (1-octet): Contains the total length in octets of this message. Since the feedback messages are not necessarily of fixed size, the length field aids stations to identify the end of a feedback message.

Field 703, Start_S1 (4-octets): Identifies the absolute time that corresponds to the first slot in the sequence of slots identified by this feedback message. Start_S1 particularly identifies the cluster of successive transmission slots for which this feedback message refers to.

Field 704, CID_x (1-octet): If the CID_x, where x ranges from 1 to N inclusive, is equal 0, then this implies the x-th slot in the cluster contained a non-collision. If a station had transmitted in this slot, the station may consider its transmission as successful and terminate its current contention resolution. On the other hand, if CID_x is larger than 0, then this implies that the x-slot in the cluster contained a collision. Moreover this collision is assigned the CID=CID_x. Stations that have their collided transmissions assigned the CID_x wait until a (re)transmission allocation message will contain the same CID value to determine when they can retransmit.

The parameter N represents the number of slots in the cluster of transmission time intervals that this feedback message refers to. The length of the message, LNG 702, satisfies LNG=6+N, hence, N=LNG−6. If multiple sequences are allowed, then a sequence id field may be added.

Already assigned CID values should not be reassigned. While there are still stations whose most recent transmission resulted in a collision, the CID assigned to that collision should not be assigned to any other collision prior to all the stations whose most recent transmission resulted in a collision retransmitting at least once. The H/E must keep track, implicitly or explicitly, of which collisions it has assigned which CIDs. This way preferential treatment of contention resolutions, if desired, may be achieved.

The order with which CIDs are invoked by the H/E in the successive (re)transmission allocation messages is discussed next. The order with which CIDs are called in successive (re)transmission allocation messages effects the order with which collisions are resolved. Similar to allowing admission properties and constraints to regulate preferences in admitting newcomers to the communication system, the order by which the CIDs are called in the (re)transmission allocation messages can be used to express preferences about the order with which to resolve collisions.

For example, assuming a single priority system, i.e., there exists no distinction between the traffic streams generated by any station. The CIDs are assigned in an incremental order where each new collision is assigned the smallest unassigned CID value. When time comes to resolve collisions, the collision with the Largest CID currently assigned is started with and decremented down through the assigned CIDs. A CID value becomes unassigned again as soon as all the stations whose most recent transmission resulted in a collision which was assigned this CID retransmit at least once.

Resolving collisions among high priority traffic prior to collisions of low priority traffic, in a system where there exist high and low priority traffic, may be accomplished as follows: while the system is idle, i.e., all stations are idle, the H/E continuously invites newcomers using information 11000000 in the Priorities field 604 (FIG. 6). This information will invite all low, indicated by the first "1", and all high indicated by the second "1", priority stations to transmit, according to the corresponding "#Inv__S1:Time__Bd" information field pairs 605, 606 (FIG. 6).

If high priority stations respond first, then the H/E may block any low priority stations by setting the priorities field 604 (FIG. 6) to 00000000 or 01000000, as needed until the contention resolution of high priority stations is completed. If low priority stations respond first, then the H/E initializes their contention resolution. However, H/E may continue to invite any high priority stations using information 01000000 in the Priorities field 604 (FIG. 6).

If high priority stations respond to the invitation while the H/E manages the contention resolution of low priority stations, it may assign a sufficiently large CID to the collisions of the high priority stations, higher CID than any CID assigned to any collision of low priority stations. With this CID assignment policy, using the decremental CID policy discussed earlier for the order that the H/E invokes the CIDs in (re)transmission allocation messages, the H/E will automatically switch first to the contention resolution of the high priority stations. The same artifice, i.e., assigning higher CIDs to high priority collisions than any CID assigned so far for other collision, can be used to address the case where following an idle period of the system., both high and low priority stations respond to the invitations sent by the H/E in (re)transmission allocation messages.

3rd Preferred Embodiment

The key objective of the second embodiment presented above was to burden the H/E with keeping track of every phase of the contention resolution process. This results in an extremely simple implementation of the proposed contention resolution algorithm in each of the communicating stations, e.g., cable modems. In a consumer oriented market, like a CaTV-based communication network, such an approach results in considerable cost reduction of the cable modems which are expected to be in the hundreds to thousands per single CATV H/E. However, there may be situations where there are only a few communicating stations per single monitor station, or there may not even be a monitor station at all. In such situations, it would be desirable to distribute the system complexity and intelligence among al: the communicating devices more uniformly.

Focusing on a CaTV-type network characterized by the presence of a monitor station, the main role of the monitor station, in a network with groups of stations that transmits to a specific upstream channel and receives on a specific downstream channel, is to provide the universal timing base across the large, geographically distributed network. It also defines the transmission time intervals for contention-prone transmissions from stations, as well as for contention-free transmissions via (re)transmission allocation messages, and reports the outcome of transmissions to stations via feedback messages.

To keep things simple for the monitor station, the transmission time intervals are assumed to be of equal length and referred to as slots. The duration of a slot is used as the time unit. The same relation exists between collections of successive slots 501 (FIG. 5) and clusters 201 (FIG. 5), where each cluster in a sequence consists of a single collection of successive slots. The number of slots in each cluster vary dynamically. The size, in number of slots, of a cluster will be determined by the (re)transmission allocation message sent by the monitor station to the communicating stations. While many sequences of clusters of slots 301, 302 (FIG. 3) may be allowed in the system, each one of these sequences is associated with one contention resolution process. Contention resolution in any additional sequences of clusters is an independent but otherwise identical procedure to the one described below.

For each collision in a cluster, a fixed number n, n=2,3, . . . , of slots are dedicated in a future cluster(s) to be used randomly for the retransmission of these collided messages. A fixed system parameter n may be hard-wired into communicating devices, or it can be programmable and set during system initialization. Moreover, collisions are not assigned a CID as in the prior embodiments. This implies that the stations themselves, observing the sequence of feedback messages, will find in which cluster and in which slot of that cluster they can retransmit again.

To simplify the system operation further, contrary to the previous embodiments, newcomers will be freely allowed transmission in the first cluster of successive slots defined by the first (re)transmission allocation message that they receive from the H/E. In case of multiple sequences of clusters in the system, a station will perform all its subsequent retransmissions on the clusters that belong to the same sequence of clusters where it did its first transmission.

All the above substantially simplifies the amount of contention-resolution control information that flows between the monitor station and the stations. The amount of processing that the monitor station has to do to facilitate the contention resolution is thereby simplified.

Instead of presenting the details of the (re)transmission allocation and feedback messages shown in FIGS. 6, 7 an assumption is made that a (re)transmission allocation message contains, at the minimum, the following information:

(a) the absolute time corresponding to the first slot in the defined cluster; and (b) the number M of slots in the cluster.

The latter takes advantage of the knowledge that the slot sizes are equal and are taken as the unit of time and that slots in a cluster are successive. The feedback message is assumed to contain the transmission status, e.g., collision, idle, success, of each transmission in each slot of a corresponding cluster. The feedback message may optionally contain an identifier to associate this feedback message with the corresponding cluster. The monitor station may send the feedback message for a cluster as soon as it receives and process all the transmissions from this cluster. Knowing the round-trip and processing delays, a station may be able to estimate quite accurately when it will receive the feedback message for a particular cluster.

Figure 8:
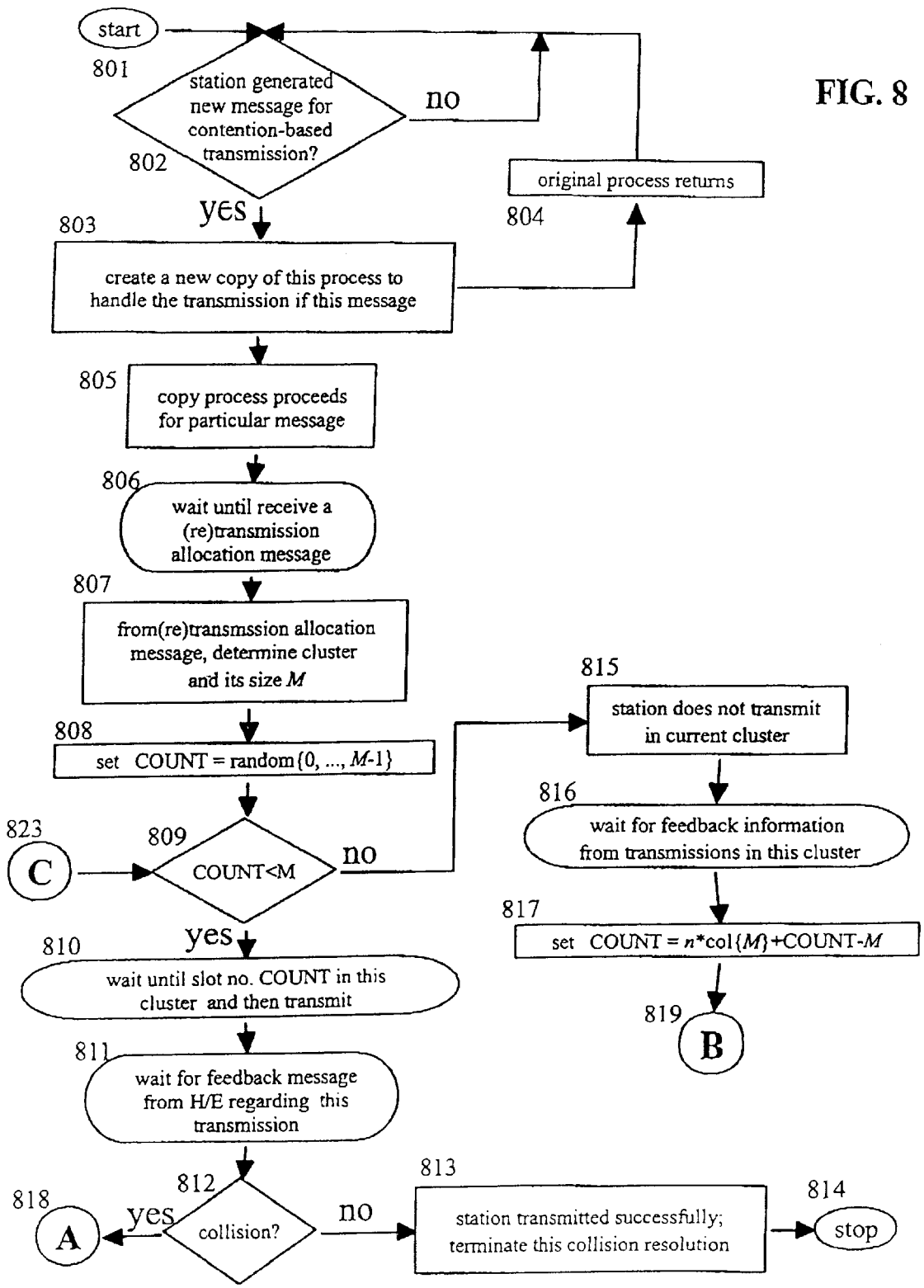
FIG. 8 is a flowchart of an algorithm which guarantees an expedited and fair message transmission of another embodiment of the present invention.
Figure 8:
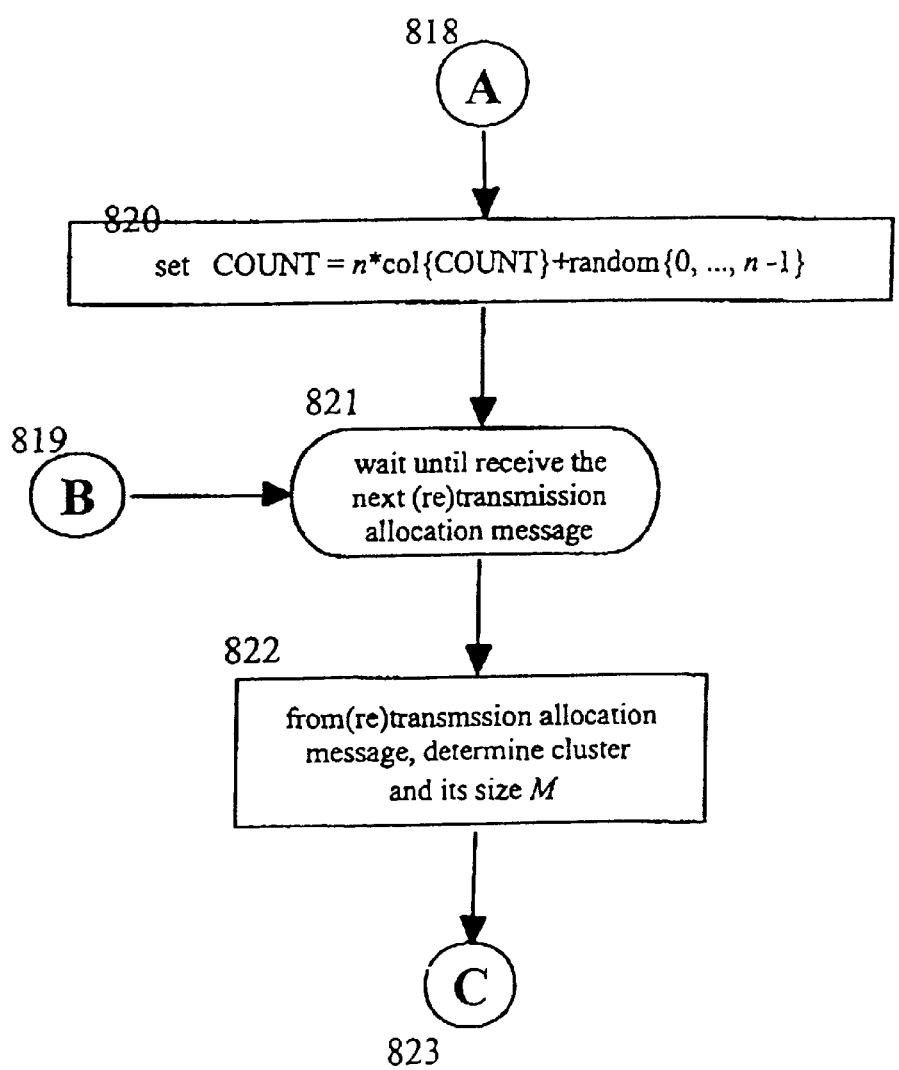

FIG. 8($a$) shows a flow chart of steps of the third embodiment. Steps 801–805 correspond to steps 401–405 of the flow chart shown in FIG. 4($a$) and described above. These steps describe generation of a new message by a newcomer station and creation of a copy of a process to deal with the transmission of a message it has just generated.

At step 806, a newcomer station waits to receive a (re)transmission allocation message that will define a cluster of slots on which it will transmit its newly generated message for the first time. After receiving the first such message, M, the number of slots contained in this cluster, i.e., the size of the cluster, is determined at step 807. At step 808, the station sets an internal variable, COUNT, to the value random$\{0, 1, \ldots, M-1\}$, where random$\{A, \ldots, L\}$ denotes the random selection of one of the elements inside the curly brackets.

At step 809, a determination is made whether COUNT is less than M, the number of slots defined in the most recently received (retransmission allocation message. According to the initialization rule of the COUNT variable in step 808, a newcomer always has COUNT less than M.

If COUNT is less than M, then at step 810, after waiting until the cluster of slots for transmission arrives, a transmission is made in slot number COUNT, where the slots in a cluster are assumed to be indexed in sequence from the earliest to the latest as $\{0, 1, \ldots, M-1\}$. This implies that the newcomer transmits with equal probability in any of the M slots of this cluster. Other transmission probability distributions may be considered but the uniform distribution is the simplest-, more natural, and fair. At step 811, the station waits for the corresponding feedback message, to learn of the outcome of its own transmission as well as of the other transmissions in same cluster.

After receiving the feedback message, a determination is made at step 812 whether the transmission resulted in a collision. If the station's message transmission did not experience a collision, the station has successfully transmitted its message in a contention.-mode at step 813 and at step 814 this contention resolution is terminated. If, on the other hand, the station experienced a collision at step 818, variable COUNT is set at step 820 (FIG. 8(*b*)), to the value $(n*\mathrm{col}\{COUNT\}+\mathrm{random}\{0,1\ldots,n-1\})$, where col{COUNT} represents the number of collisions that have occurred in the same cluster that the station transmitted but to the left of the slot that it transmitted, i.e., the number of collisions in slots $0, 1, \ldots, COUNT-1$. As long as it is done consistently, collisions that have occurred to the right of the slot that the station transmitted, may be counted instead. Having updated its COUNT variable, the station can now iterate through the contention-resolution process.

The following (re)transmission allocation message is received after a wait at step 821 (FIG. 8(*b*)). This message will determine the next cluster over which the station will continue its contention resolution. From this, new (re) transmission allocation message, similar to step 807, the number of slots M in this next cluster is learned at step 822 (FIG. 8(*b*)). Having updated the COUNT variable and learned of the size of the cluster M the station will iterate through the process starting at step 809, (FIG. 8(*a*)).

If COUNT, tested at step 809, is not less than M, the station, at step 815, will refrain from transmitting in the cluster of slots defined by this most recently received (re)transmission allocation message. The feedback message that contains the outcomes of the transmissions within this cluster will nevertheless be awaited and received at step 816. This is one of the main points of difference between this embodiment and the two presented above. Previous embodiments only required a station to track the feedback information of its own transmission. At step 817, this feedback message read, its COUNT variable is updated to the value $(n*\mathrm{col}\{M\}+COUNT-M)$, where col{M} represents the number of collisions that have occurred in slots $0, 1, \ldots, M-1$, or in other words, the total number of collisions in the cluster under consideration. At this point advantageously, the system parameter n is already known to the stations. Providing the stations participating in a contention resolution with the means to dynamically update this parameter always to the same value results in a more powerful system could be possible. At this point the control of the process is transferred through step 819 to step 821 (FIG. 8(*b*)).

In Table 1, the algorithm performed by each station waiting to transmit is summarized. One cycle of the algorithm occurs for each cluster of slots in a particular sequence of clusters of slots.

TABLE 1

Figure 9:
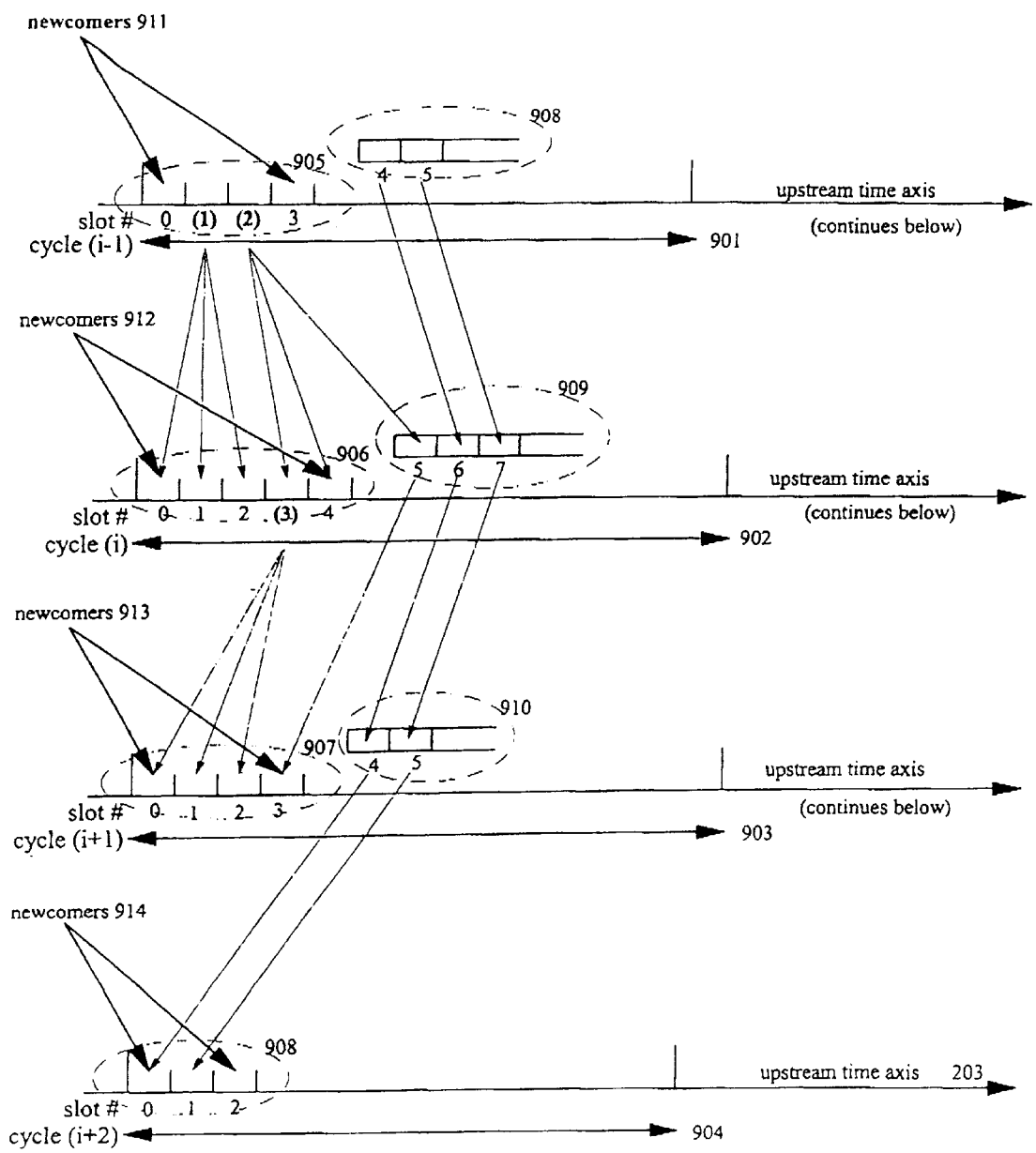
FIG. 9 is a sequence of linear diagrams showing cycles on the upstream transmission axis representing an example of the contention resolution process.

The contention resolution algorithm 1. a newcomer initializes COUNT←random{0, 1, . . . , M−1}, where M is the number of slots defined in the (re)transmission allocation message just received;
2. if (COUNT<M), then
   a. station transmits in Transmission Time Interval number COUNT of the cluster;
   b. upon receiving the feedback message for this cluster:
      i. if (did__not__collide), then DONE;
      ii. else if (collide)
         set: COUNT←n*col(COUNT) + random{0, n − 1};
         wait for next (re)transmission allocation message, determine new M, and repeat from the top of step 2;
3. else if (COUNT ≧ M), then
   a. station does not transmit in this cluster;
   b. upon receiving the feedback message for this cluster;
      i. set: COUNT←n * col{M} + COUNT −M;
      ii. wait for next (re)transmission allocation message, determine new M, and repeat from the top of step 2;

FIGS. 9(*a*)–9(*d*) shows a sequence of cycles 901–904 on the upstream transmission axis 203 representing an example of the contention resolution process executed by the stations. Within each cycle there exists a corresponding cluster of successive slots, indexed as $0, 1, \ldots, M-1$, where stations attempt their transmissions. Note that neither the duration of a cycle nor the number M needs to be fixed from one cycle to the next. The sequence of clusters 905–908 corresponds to one of the sequences of cluster of transmission time intervals 305–308 (FIG. 3) and 201 FIG. 5. The slots where collisions have occurred are shown with parentheses, e.g., slots (1) and (2) of cluster 905 contain a collision, while slots 0 and 3 from the same cluster do not contain a collision, i.e., they are either idle, or contain a single successful transmission.

The stack 908–910 aids in presenting the operation of the algorithm and is not implemented by any station. The stack consists of cells, whose contents are updated once per cycle. Stack cells contain stations whose messages are not allowed to be transmitted in the current cluster. At each cycle, the stack cells are indexed es M, M+1, M+2, . . . , where M is the number of slots in the cluster of the corresponding cycle. For example, considering cycle (i−1) 901 and the corresponding cluster 905 and stack 908, there are 4 slots in the cluster, indexed as 0, 1, 2, 3 and the stack cells are indexed starting with 4, then 5, etc.

Newcomers 911–914 always transmit in the first cluster they encounter by randomly selecting any of the slots of the cluster. Following a collision, each collided group of stations splits into three groups with equal probability. For each such collision, the corresponding groups attempt to transmit in the slots of the next cluster in the sequence. Stations that cannot fit in a cluster are placed in the corresponding cells of the stack, as if they were regular slots. For example, considering collisions in slots number 1 and 2 of cluster 905, denote these slots as 905-1 and 905-2. The stations that collided in slot 905-1, the first collision in cluster 905, will split in three subgroups end each subgroup will transmit in the first three slots of cluster 906, to be referred to as slots 906-0, 906-1 and 906-2. The stations that collided in slot 905-2 will again split in three subgroups, and, because they were in the second collision in cluster 905, they will attempt transmission in the three slots following, slots 906-0, 906-1 and 906-2 that have been set aside to be used by the stations that collided in slot 905-1.

Cluster 906 has only 5 slots, hence it cannot accommodate all the three subgroups following the split of the stations that collided in slot 905-2. Instead, the third subgroup will be moved in the first cell of the stack 909, which is conveniently indexed with the number 5, i.e., if slot 906-5 were present within cluster 906, the stations would have allowed to transmit in that slot. Stations that were already present in the cells of the stack shift to higher numbered cells, e.g., the stations that were in cells 4 and 5 in stack 908, i.e., the lowest two cells of the stack, move one cell higher in stack 909 to make space for the unlucky third subgroup that cannot transmit in the slots of cluster 906. Stations within the stack shift to lower cells of the stack and eventually into actual transmission slots of a cluster, whenever a cluster has more slots available than the number of slots required to accommodate the subgroups resulting from the split of collided stations in the previous cluster. This is shown in for cycles (i+1) and (i+2). The cluster 907 in cycle (i+1) contains no collisions, hence the stations residing in cells 4 and 5 of stack 910 can shift to, and thus transmit., in slots 0 and 1 of cluster 908 in cycle (i+2).

The stations that transmit in different slots of a cluster never collide with each other in future clusters, thus this algorithm is a member of the tree-search class of algorithms. Stations that collide in a cluster always leave sufficient space to their left in the next cluster following their split to accommodate the split of any additional collisions to their left in the first cluster. Stations eventually transmit successfully, shifting through the cells of the stack and the slots of clusters. As previously mentioned, the stack is merely an artifice to visualize the operation of the system, and no station realizes or implements the stack.

To move through the stack cells and the transmission slots of a cluster in a consistent way, each station simply uses the internal variable COUNT which it updates according to the algorithm flow shown in FIGS. 8($a,b$) and in Table 1. At each cycle the value of the COUNT variable at the beginning of the cycle will determine whether the station will transmit during this cycle, and if yes in which slot to transmit, or it will reside in cell number COUNT of the stack. Following the transmissions in a cluster, all collided stations and all stations that did not transmit in this cluster, i.e., these stations waiting in a cell within the stack, will update their COUNT variable and they will transmit in slot number COUNT of the next cluster if its size M satisfies COUNT<M, or they will shift to cell number COUNT of the stack.

For the example, shown in FIG. 9, the parameter n has been set to the value 3 on purpose, because it has been shown that this selection gives the best performance for the case where n is fixed. From prior art referenced herein, it is known that the maximum throughput achieved under the infinite station Poisson traffic model, when there is always only one slot per cluster is,:

(a) for n=2: 0.360 messages per slot;

(b) for n=3: 0.401 messages per slot;

(c) for n=4: 0.399 messages per slot;

(d) for larger values of n: the number of messages per slot decreases monotonically.

Under the same conditions, the best ALOHA-based protocol can achieve a 0.368 messages per slot throughput.

Figure 10:
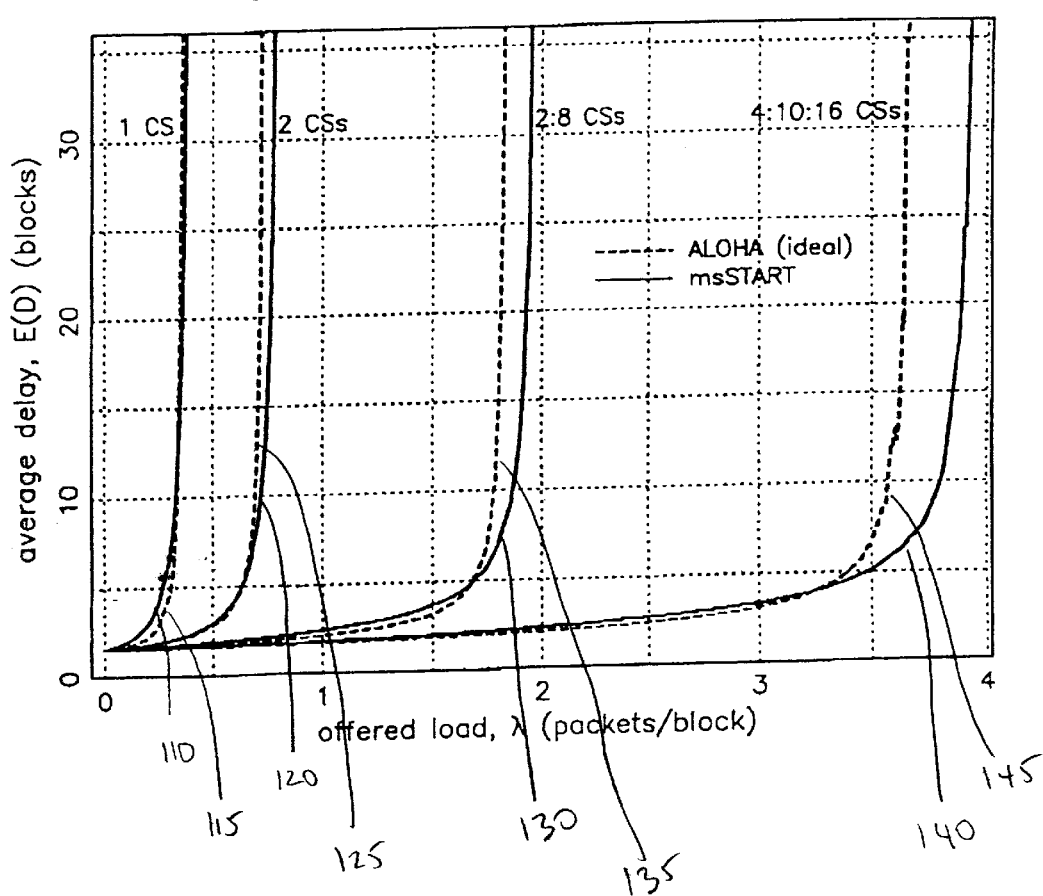
FIG. 10 is a graph showing performance comparison results between a system that operates with the algorithm described in an embodiment of the present invention, msSTART, and the ideal ALOHA contention-resolution protocol.

FIG. 10 shows performance comparison results between a system that operates with the algorithm described in this embodiment, referred to as the multi-slot n-ary Stack Algorithm (msSTART) with n=3 (solid line) 110, 120, 130, 140, and the ideal ALOHA contention-resolution protocol (dashed line) 115, 125, 135, 145. According to the ideal ALOHA protocol, which is not implementable, but provides a limit for the best performing ALOHA-type protocol, at the beginning of each cluster, the exact number of stations waiting to transmit or retransmit is known and so all these stations transmit in the slots of a cluster with a probability that is inversely proportional to this number. For the results in this figure, all cycles, called blocks, are assumed to be of fixed duration, however, the size of the cluster of contention-prone -slots per block may vary. The curves show the average delay, E(D), experience by packets of fixed size messages, as the offered load, $\lambda$, to the system increases. The delay D counts the random time elapsed from the time the packet is generated by a station, again assuming an infinite station Poisson traffic model, until the end of the block in which this packet is successfully transmitted. The integer part of D represents the number of algorithmic iterations required to transmit a packet.

The curves 110, 115, 120, 125, noted with 1 and 2 contention slots (CSs), 1 or 2 contention-prone slots per cluster, are always assumed to be present. For the curves 130, 135, noted with a 2:8 CSs, it is assumed that number of contention-prone slots in successive clusters alternate between 2 and 8. Finally for the curves 140, 145 noted with a 4:10:16 CSs, it is assumed that the number of contention-prone slots in a cluster is either 4, 10, or 16 CSs randomly selected. In all occasions the use of msSTAR with the splitting parameter n fixed to the value 3, performs comparably to the ideal ALOHA at low loads, and it consistently outperforms it al: higher loads.

The present invention may be effected in many ways. For example it may also be effected as an article of manufacture, a program storage device, a computer program product, etc.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method of communicating in a multi-access computer communication system comprising a plurality of stations and a first communication channel, wherein said stations communicate using messages transmission over said first communications channel, the method comprising:

generating a plurality non-overlapping transmission time intervals of variable durations;

grouping said time intervals into a plurality of clusters, wherein the number of said time intervals and time distances between them varies within each of said clusters;

forming a plurality of sequences of said clusters, wherein the time distance from the end of one of said clusters comprising each sequence to the beginning of the next of said clusters comprising same sequence is such that any of said stations transmitting in said sequence will learn a status information of said message transmission prior to commencement of next of said clusters; and sending said message transmission from said stations during said time intervals via said first communication channel.

2. The method of claim 1, wherein said time intervals are of a fixed size.

3. The method of claim 1, wherein said time intervals in each cluster of said sequences are in sets of contiguous time intervals.

4. The method of claim 1, wherein the time distance between the beginnings of successive clusters of said sequences is constant.

5. The method of claim 1, wherein different sequences of clusters are identified by a unique sequence id.

6. The method of claim 1, wherein said first communications channel comprises various interconnected communication media.

7. The method of claim 1, wherein said stations are computer communicating devices.

8. The method of claim 7, wherein said status is determined to be not-successful if following said message transmission in a first cluster of a sequence, contents of said message transmission in a first cluster are destroyed by a collision of said message transmission from said stations, and said stations learn that said contents are destroyed prior to a commencement of a second cluster following a first cluster from a same sequence.

9. The method of claim 8, further comprising steps of:
proceeding iteratively along said clusters of one of said sequences, each iteration exclusively pertaining to all said time intervals in one of said clusters and all said message transmission in said time intervals; and
resolving said collision by retransmitting said message transmission that resulted in said collision according to rules for said message transmission until said message transmission is transmitted collision-free.

10. The method of claim 9, wherein rules for said message transmission comprise:
first message transmission rules to regulate a first message transmission by a newcomer station, where said message transmission is waiting to be sent in one of said time intervals.

11. The method of claim 10, wherein rules for said message transmission further comprise:
subsequent transmission rules to regulate a subsequent transmission of collided messages in the future, in said time intervals relative to the one of said time intervals used for said message transmission that resulted in said collision.

12. The method of claim 11, wherein each said newcomer station selects a time interval, a cluster and a sequence, from said time intervals of said clusters of said sequences to execute said message transmission according to said first message transmission rules, and when said message transmission is destroyed by said collision, said station makes subsequent transmission of each said subsequent transmission destroyed by said collision.

13. The method of claim 12, wherein each said subsequent transmission is transmitted in a subsequent time interval to said time interval during which previous transmission occurred, according to said subsequent transmissions rules.

14. The method of claim 13, wherein said subsequent retransmission rules are such that, if a first message transmitted in a first transmission time interval of a first cluster resulted in said collision, and a second message transmitted in a second transmission time interval of a first cluster resulted in said collision, said first message and said second message will not collide with each other in any future transmissions relative to said first cluster.

15. The method of claim 13, wherein said first transmission rules are applicable selectably to different subsets of said time intervals that said newcomer station uses for said first message transmission, said subsets comprising of a partition of said time intervals, and said first transmission rules are applicable identically to all said time intervals in each of said subsets.

16. The method of claim 13, wherein said first transmission rules are applicable identically to all said time intervals that said newcomer station uses for said first message transmission.

17. The method of claim 13, wherein said message transmissions and message retransmissions within different sequences follow independent rules for said message transmissions and said message retransmissions.

18. The method of claim 13, wherein said stations with a plurality of messages waiting to be transmitted execute a plurality of contention resolution methods in parallel in order to transmit said plurality of messages.

19. The method of claim 18, wherein said stations select one out of said plurality of messages waiting to be transmitted at each message transmission opportunity according to a selection rule.

20. The method of claim 19, wherein said selection rule randomly selects any one of said plurality of messages.

21. The method of claim 19, wherein a same contention resolution method of said plurality of contention resolution methods executed in parallel by said stations allows said stations to transmit, said stations will select a same message awaiting said message retransmissions.

22. The method of claim 13, wherein said first transmission rules are applicable separately to each individual of said time intervals that said newcomer station uses for said first message transmission.

23. The method of claim 22, wherein said first transmission rules are applicable to newcomer clusters, where all said time intervals belong to one cluster of said sequences that are designated for said first message transmission by said newcomer stations, said newcomer stations are waiting to transmit said first message transmission.

24. The method of claim 23, wherein said first transmission rules, restrict the number of stations allowed to transmit among said newcomers, according to an admission rule.

25. The method of claim 24, wherein said admission rule allows only a percentile of said newcomer stations to transmit on said time intervals associated with said newcomer stations, and on said time intervals associated with groups of newcomer stations.

26. The method of claim 24, wherein said admission rule allows newcomer stations to transmit only messages generated within a specified time period, on said time intervals associated with said newcomer stations, and on said time intervals associated with said groups of newcomer stations.

27. The method of claim 24, wherein said admission rule further comprises an admission property, said admission rule allows said first message transmission from said newcomer stations only if said contents of said first message transmission satisfy said admission property.

28. The method of claim 27, wherein said admission property distinguishes said messages according to various collision resolution priorities, where resolution of said collision of said message transmission belonging to a higher priority is attempted prior to resolution of said collision of said message transmission belonging tc a lower priority.

29. The method of claim 27, wherein said stations with message transmissions eligible to be transmitted, randomly select said time intervals and transmit in any of said time intervals associated with said newcomer stations, and said time intervals associated with said groups of newcomer stations.

30. The method of claim 13, wherein for each of a plurality of parent collisions in a parent cluster of a resolution sequence, there is a child group of time intervals for a child transmission in a following cluster of said resolution sequence according to said subsequent transmission rules, said parent cluster is said cluster during which one of said parent collisions occur, and said resolution sequence is said sequence where said parent cluster belongs.

31. The method of claim 30, wherein each said child group comprises a variable number of said time intervals.

32. The method of claim 31, wherein each said child group further comprises one or more child subgroup of said time intervals, each said subgroup belonging to different future clusters of said resolution sequence.

33. The method of claim 32, wherein the number of child subgroups in a child group changes dynamically based on message transmissions and message transmission outcomes in a subset of said child subgroups.

34. The method of claim 33, wherein said time intervals of said child group are used for a retransmission of said messages destroyed in one of said parent collisions.

35. The method of claim 33, wherein said subsequent transmission rules are applicable separately to each of said time intervals of said child group.

36. The method of claim 33, wherein said subsequent transmission rules are applicable selectably to subsets of said time intervals of said child group, said subsets comprising a partition of the time intervals of said child group, and said subsequent transmission rules are applicable identically to all said time intervals in each said subset.

37. The method of claim 33, wherein said subsequent transmission rules are applicable identically to all said time intervals of said child group.

38. The method of claim 35, wherein said stations transmit said subsequent transmissions in said child group according to said subsequent transmission rules and according to a probability distribution, said probability distribution allows said stations to randomly transmit in the i-th of said time intervals with probability $p_i$, i=1, ... k, where said child group consists of k time intervals and $p_1 + \ldots + p_k = 1$.

39. The method of claim 35, wherein, said stations transmit said subsequent transmissions in said child group according to said subsequent transmission rules and according to a probability distribution, said probability distribution allows said stations to transmit in the m-th of said time intervals with probability $b_m$, m=j, ..., k, where se-id child group consists of k time intervals, $b_j + \ldots + b_k = 1$, and said station has not selected to transmit in any of the first (j−1) of said transmission time intervals.

40. The method of claim 35, wherein, said Stations transmit said subsequent transmissions in said child group according to said subsequent transmission rules and according to a set of time periods, said station will transmit in the i-th of said time intervals if said contents of said message transmission was generated during a time period $t_i$ of said set of time periods, where said child group consists of k time intervals, the time periods $t_i$, i=1, ..., k, are non-overlapping, $t_1 + \ldots + t_k = t_p$, and $t_p$ represents the time period during which all messages in one of said parent collisions were generated.

41. The method of claim 35, wherein said multi-access computer communication system is a wireless-based digital radio network.

42. The method of claim 35, wherein said multi-access computer communication system is a wireline-based data network.

43. The method of claim 35, wherein said multi-access computer communication system is an infrared-based local area network.

44. The method of claim 35, wherein said multi-access computer communication system is a fiber-optic-based data network.

45. The method of claim 35, further comprising a monitor station and a second communication channel, where said monitor station transmits messages to said stations using said second communication channel, which is not shared for said message transmissions by said stations.

46. The method of claim 45, wherein said second communication channel used for said monitor station transmissions is on a different communications medium than said first communication channel used for the station transmissions.

47. The method of claim 45, wherein said second communications channel comprises various interconnected communication media.

48. The method of claim 45, wherein said stations and said monitor station are connected to different communications media.

49. The method of claim 45, wherein said monitor station determines a start and a duration of said time intervals in said first communication channel, and notifies said stations of said start and said duration of said time intervals through said second communication channel.

50. The method of claim 49, wherein said monitor station determines said start and said duration of said time intervals allocated for a first transmission of new messages and notifies said newcomer stations via invitation messages of said time intervals allocated for a first transmission of new messages.

51. The method of claim 50, wherein said monitor station notifies said stations of said first transmission rules, via said invitation messages and within other messages, said first transmission rules to be used by said stations for said first message transmission.

52. The method of claim 51, wherein said monitor station notifies said stations of portions of said first transmission rules not already known to said stations.

53. The method of claim 52, wherein said monitor station monitors said message transmissions by said stations in each of said time intervals and announces to said stations via feedback messages, whether message transmissions in each of said time intervals resulted in a collision.

54. The method of claim 53, wherein said monitor station determines said time intervals allocated in said child group for said subsequent transmissions and notifies said stations via retransmission allocation messages.

55. The method of claim 54, wherein said monitor station notifies said stations whose most recent message transmission was a collision identified by said collision id, of said subsequent transmission rules, via retransmission allocation messages, or within other messages.

56. The method of claim 54, wherein said monitor station notifies said stations of said subsequent transmission rules via retransmission allocation messages and via other messages, said subsequent transmission rules to be used by said stations for said subsequent transmission if a prior message transmission was destroyed by said collision.

57. The method of claim 56, wherein said monitor station notifies stations of portions of said subsequent transmission rules not known to said stations.

58. The method of claim 57, wherein said monitor station notifies said newcomer stations of said admission rule via said invitation messages and within other messages.

59. The method of claim 58, wherein said monitor station
- assigns to each said collision a collision id, according to an assignment rule,
- announces said collision id to said stations, via said feedback messages and other messages,
- said stations storing said collision id to be utilized in the future for retransmission of said message transmission destroyed in a collision.

60. The method of claim 59, wherein said monitor station determines said time intervals of said child group and then notifies said stations having each of said parent collisions assigned a parent collision id, via (re)transmission allocation, said child group is assigned said parent collision id.

61. The method of claim 60, wherein said assignment rule used by said monitor station is such that each said collision is assigned a unique collision id belonging to a list of unassigned collision ids, where said monitor station places each assigned collision id in a list of assigned collision ids, removes a collision id from said list of assigned collision ids and places it back into said list of unassigned collision ids after all messages that collided in a parent collision which was assigned same collision id retransmit at least once.

62. The method of claim 61, wherein said monitor station assigns collision ids to each collision from said list of unassigned collision ids in a monotonic first order, either increasing, or decreasing.

63. The method of claim 62, wherein said monitor station associates said collision ids to said child group for said message retransmission in said parent collision having the same collision id assigned to it, in a monotonic second order among the collision ids in said list of assigned collision ids, said monotonic second order running a direction opposite to said monotonic first order.

64. The method of claim 63, wherein high priority message collisions are assigned collision ids larger than lower priority collisions, when said collision ids are assigned in an increasing order.

65. The method of claim 63, wherein high priority message collisions are assigned collision ids smaller than the low priority message collisions when said collision ids are assigned in a decreasing order.

66. The method of claim 57, wherein said stations perform said message transmission and resolving possible collisions according to following steps:

a. setting a COUNT variable to a value k, where k is a result of a function random$\{0, 1, \ldots, M_f-1\}$ which denotes the uniformly random selection of contents inside curly braces, $M_f$ is an integer signifying the number of said time intervals in a first cluster encountered by said newcomer station, said time intervals are indexed as $0, 1, \ldots, M_f-1$;

b. transmitting in said time interval number COUNT of said cluster;

c. following message transmission in said cluster, notifying all stations of the outcome of said transmission via feedback messages from said monitor station;

d. terminates further transmission attempts of said message transmission if said feedback messages indicate that said message transmission in said time interval number COUNT of said cluster was a non-collision;

e. for stations that transmitted in said time interval number COUNT of said cluster, setting said variable COUNT to COUNT $\leftarrow$ n*col$\{$COUNT$\}$+random$\{0, 1, \ldots, n-1\}$, where col$\{$COUNT$\}$ is a number of collisions which occured within time intervals number $0, 1, \ldots$, COUNT-1 of said cluster, and a parameter n is a variable integer equal to or larger than 2 whose exact value is known to and is the same for all said stations prior to setting said variable COUNT, if said feedback messages indicates that said message transmission in said time interval number COUNT of said cluster was a collision, f. for stations that did not transmit in any of said time intervals for which said feedback messages were received, setting said variable COUNT to COUNT $\leftarrow$ n*col$\{M_b\}$+COUNT-$M_b$, where said parameter n has the same value as in the step (f) and is known to all said stations prior to setting said variable COUNT, $M_b$ is the number of said time intervals in said cluster, and col$\{M_b\}$ is said number of collisions which occured during all said time intervals of said cluster, following a receipt of said feedback messages;

g. transmitting in said time interval number COUNT of a following cluster of said sequence if said variable COUNT is less than $M_c$, and refraining from transmitting in said time interval number COUNT of said following cluster if said variable COUNT is equal or larger than $M_c$, where $M_c$ is the number of transmission time intervals in said following cluster in said sequence; and h. setting $M_b=M_c$ and continuing to resolve collisions iteratively from step (c) until said message transmissions are successful.

67. The method of claim 66, wherein said parameters $M_f$, $M_b$, $M_c$, and n are determined and said stations participating in said collision resolution are notified by said monitor station, via retransmission allocation messages.

68. The method of claim 66, wherein said parameter n is a known constant integer larger or equal to 2.

69. The method of claim 57, wherein said stations transmit only to said monitor station sharing a common first communication channel, while receiving transmissions only from said monitor station on a second communication channel.

70. The method of claim 57, wherein each successful message transmission by one of said stations in a first of said time intervals, one or more collision-free message transmissions are scheduled for that station in subsequent time intervals, said time intervals being of variable duration and distance between them, and do not belong to any of said sequences of clusters used exclusively for message transmissions that may experience a collision.

71. The method of claim 70, wherein scheduling of future contention-free message transmissions by stations is done by said monitor station, said monitor station determining a start and a duration of said time intervals for contention-free message transmissions, and notifying said stations of said time intervals where said stations will transmit said future contention-free messages.

72. The method of claim 57, wherein said multi-access computer communication system is a satellite-based data network.

73. The method of claim 57, wherein said multi-access computer communication system is a Cable TV-based data network.

74. The method of claim 57, wherein said multi-access computer communication system is a cellular packet-radio-based network.

75. A method of communicating in a multi-access computer communication system comprising a plurality of stations and a plurality of communication channels, wherein for each one of said plurality of communication channels there exists a subset of said stations, wherein said stations communicate by message transmissions over said one communications channel, the method comprising:

generating a plurality non-overlapping transmission time intervals of variable durations;

grouping said time intervals into a plurality of clusters, wherein the number of said time intervals and time distances between them varies within each of said clusters;

forming a plurality of sequences of said clusters, wherein the time distance from the end of one of said clusters comprising each sequence to the beginning of the next of said clusters comprising that sequence is such that any of said stations transmitting in said sequence will learn a status information of said message transmission prior to commencement of next of said clusters, said status identifying said message transmissions as successful and not-successful; and sending said message transmissions from said stations during said time intervals via said first communication channel.

76. A method of communicating in a multi-access computer communication system comprising a plurality of stations, a monitor station, a plurality of first communication channels, and a plurality of second communicating channels, wherein said first communication channels do not comprise said second communication charnels, said stations transmit on said first communication channels, said monitor station transmits to the other stations on said second communication channels, for each one of said first communication channels and of said second communication channels, there exists a subset of said stations that perform message transmissions on one of said first communication channels, receive from said monitor station on one of said second communication channels, the method comprising:

generating a plurality non-overlapping transmission time intervals of variable durations;

grouping said time intervals into a plurality of clusters, wherein the number of said time intervals and time distances between them varies within each of said clusters forming a plurality of sequences of said clusters, wherein the time distance from the end of one of said clusters comprising each sequence to the beginning of the next of said clusters comprising that sequence is such that any of said stations transmitting in said sequence will learn a status information of said message transmissions prior to commencement of next of said clusters, said status identifying said message transmissions as successful and not successful; and sending said message transmissions from said stations during said time intervals via said first communication channel.

77. An article of manufacture comprising a computer usable medium having computer readable program code means embodied therein for causing communication in a multi-access computer communication system comprising a plurality of stations and a first communication channel, wherein said stations communicate using message transmission over said first communications channel, the computer readable program code means in said article of Manufacture comprising computer readable program code means for causing a computer to effect:

generating a plurality non-overlapping transmission time intervals of variable durations;

grouping said time intervals into a plurality of clusters, wherein the number of said time intervals and time distances between them varies within each of said clusters;

forming a plurality of sequences of said clusters, wherein the time distance from the end of one of said clusters comprising each sequence to the beginning of the next of said cluster, comprising same sequence is such that any of said stations transmitting in said sequence will learn a status information of said message transmission prior to commencement of next of said clusters; and sending said message transmission from said stations during said time intervals via said first communication channel.

78. An article of manufacture of claim 77, wherein said stations are computer communicating devices.

79. An article of manufacture of claim 78, wherein said status is determined to be not-successful if following said message transmission in a first cluster of a sequence, contents of said message transmission in a first cluster are destroyed by a collision of said message transmission from said stations, and said stations learn that said contents are destroyed prior to a commencement cf a second cluster following a first cluster from a same sequence.

80. An article of manufacture of claim 79, the computer readable program code means in said article of manufacture further comprising computer readable program code means for causing a computer to effect:

proceeding iteratively along said clusters of one of said sequences, each iteration exclusively pertaining to all said time intervals in one of said clusters and all said message transmission in said time intervals; and resolving said collision by retransmitting said message transmission that resulted in said collision according to rules for said message transmission until said message transmission is transmitted collision-free.

81. A computer program product comprising a computer usable medium having computer readable program code means embodied therein for causing communication in a multi-access computer communication system comprising a plurality of stations and a plurality of communication channels, wherein for each one of said plurality of communication channels there exists a subset of said stations, wherein said stations communicate by message transmissions over said one communications channel, the computer readable program code means in said computer program product comprising computer readable program code means for causing a computer to effect:

generating a plurality non-overlapping transmission time intervals of variable durations;

grouping said time intervals into a plurality of clusters, wherein the number of said time intervals and time distances between them varies within each of said clusters;

forming a plurality of sequences of said clusters, wherein the time distance from the end of one of said clusters comprising each sequence to the beginning of the next of said clusters comprising that sequence is such that any of said stations transmitting in said sequence will learn a status information of said message transmission prior to commencement of next of said clusters, said status identifying said message transmissions as successful and not-successful; and sending said message transmissions from said stations during said time intervals via said first communication channel.

82. A program storage device readable by machine, tangibly embodying a program of instructions executable by the machine to perform method steps for communicating in a multi-access computer communication system comprising a plurality of stations,
a monitor station,
a plurality of first communication channels, and
a plurality of second communicating channels,
wherein said first communication channels do not comprise said second communication channels,
said stations transmit on said first communication channels,
said monitor station transmits to the other stations on said second communication channels,
for each one of said first communication channels and of said second communication channels, there exists a subset of said stations that perform message transmissions on one of said first communication channels, receive from said monitor station on one of said second communication channels, said method steps comprising:

generating a plurality non-overlapping transmission time intervals of variable durations;

grouping said time intervals into a plurality of clusters, wherein the number of said time intervals and time distances between them varies within each of said clusters forming a plurality of sequences of said clusters, wherein the time distance from the end of one of said clusters comprising each sequence to the beginning of the next of said clusters comprising that sequence is such that any of said stations transmitting in said sequence will learn a status information of said message transmissions prior to commencement of next of said clusters, said status identifying said message transmissions as successful and not successful; and sending said message transmissions from said stations during said time intervals via said first communication channel.

\* \* \* \* \*